(12) United States Patent
DeSouter et al.

(10) Patent No.: US 7,206,915 B2
(45) Date of Patent: Apr. 17, 2007

(54) VIRTUAL SPACE MANAGER FOR COMPUTER HAVING A PHYSICAL ADDRESS EXTENSION FEATURE

(76) Inventors: Marc A. DeSouter, 64 Laauwe Ave., Wayne, NJ (US) 07470; Philippe Armangau, 51 Seminole Rd., Acton, MA (US) 01720; Ishraq Mohammed Ahmed, 502 Catlin Rd., Cary, NC (US) 27519; Keith Glidewell, 222 Weaver Mine Trail, Chapel Hill, NC (US) 27517

( * ) Notice: Subject to any disclaimer, the term of this patent is extended or adjusted under 35 U.S.C. 154(b) by 380 days.

(21) Appl. No.: 10/860,523

(22) Filed: Jun. 3, 2004

(65) Prior Publication Data

US 2005/0273570 A1    Dec. 8, 2005

(51) Int. Cl.
*G06F 12/06* (2006.01)
(52) U.S. Cl. .................................... 711/203; 711/118
(58) Field of Classification Search ................ 711/203, 711/207, 170, 118
See application file for complete search history.

(56) References Cited

U.S. PATENT DOCUMENTS

| | | | | |
|---|---|---|---|---|
| 4,445,174 A | | 4/1984 | Fletcher ..................... | 364/200 |
| 4,691,280 A | | 9/1987 | Bennett ..................... | 364/200 |
| 5,606,683 A | * | 2/1997 | Riordan ..................... | 711/207 |
| 5,737,605 A | | 4/1998 | Cunningham et al. ...... | 395/670 |
| 5,873,120 A | | 2/1999 | Harvey et al. ............. | 711/173 |
| 5,893,140 A | | 4/1999 | Vahalia et al. ............. | 711/118 |
| 6,003,123 A | | 12/1999 | Carter et al. ............... | 711/207 |
| 6,081,802 A | | 6/2000 | Atherton et al. ............ | 707/3 |
| 6,112,286 A | | 8/2000 | Schimmel et al. .......... | 711/208 |
| 6,182,089 B1 | | 1/2001 | Ganapathy et al. ......... | 707/206 |
| 6,185,575 B1 | | 2/2001 | Orcutt ........................ | 707/200 |
| 6,240,501 B1 | | 5/2001 | Hagersten ................... | 711/202 |
| 6,314,501 B1 | | 11/2001 | Gulick et al. ............... | 711/153 |
| 6,324,581 B1 | | 11/2001 | Xu et al. .................... | 709/229 |

(Continued)

FOREIGN PATENT DOCUMENTS

GB     2260429 A  *  4/1993

(Continued)

OTHER PUBLICATIONS

EMC Celerra SE5 File Server, EMC Corporation, Hopkinton, MA, 2002, 2 pages.

(Continued)

*Primary Examiner*—Pierre-Michel Bataille
(74) *Attorney, Agent, or Firm*—Richard C. Auchterlonie; Novak Druce & Quigg, LLP

(57) ABSTRACT

A physical address extension feature maps multiple virtual memory spaces to an extended physical memory. A virtual space manager dynamically allocates pages of the physical memory to respective virtual spaces. The virtual space manager responds to a request from an application for allocation of a page of physical memory by returning a cookie indicating the allocated page. The virtual space manager responds to a request including the cookie by switching virtual address translation to the virtual memory space including the indicated page. The cookie is used to access a cookie cache of state information on the last page of virtual memory having been mapped into physical memory. For example, segments of the page store block map entries for snapshot copies, and the cookie cache caches the last-accessed values of the block numbers and their location within the page.

10 Claims, 17 Drawing Sheets

U.S. PATENT DOCUMENTS

| | | | |
|---|---|---|---|
| 6,381,682 B2 | 4/2002 | Noel et al. | 711/153 |
| 6,430,667 B1 | 8/2002 | Loen | 711/202 |
| 6,430,668 B2 * | 8/2002 | Belgard | 711/202 |
| 6,434,681 B1 | 8/2002 | Armangau | 711/162 |
| 6,442,682 B1 | 8/2002 | Pothapragada et al. | 713/1 |
| 6,477,612 B1 * | 11/2002 | Wang | 711/2 |
| 6,549,992 B1 | 4/2003 | Armangau et al. | 711/162 |
| 6,594,735 B1 | 7/2003 | Baker et al. | 711/147 |
| 6,604,182 B1 | 8/2003 | Sexton et al. | 711/170 |
| 6,618,792 B1 | 9/2003 | Perrin et al. | 711/122 |
| 6,622,229 B2 | 9/2003 | Morgenstern et al. | 711/203 |
| 6,799,173 B2 | 9/2004 | Czajkowski et al. | 707/2 |
| 6,981,125 B2 | 12/2005 | Emmes | 711/207 |
| 7,010,655 B1 | 3/2006 | Harmer et al. | 711/163 |
| 2003/0018691 A1 | 1/2003 | Bono | 709/106 |
| 2004/0030727 A1 | 2/2004 | Armangau et al. | 707/200 |
| 2004/0030846 A1 | 2/2004 | Armangau et al. | 711/154 |
| 2004/0030951 A1 | 2/2004 | Armangau et al. | 714/6 |
| 2004/0128542 A1 * | 7/2004 | Blakley et al. | 713/201 |
| 2005/0015354 A1 | 1/2005 | Grubbs et al. | 707/1 |
| 2005/0216695 A1 | 9/2005 | Bono | 711/203 |

FOREIGN PATENT DOCUMENTS

WO      WO 9714084 A2 *    4/1997

OTHER PUBLICATIONS

"Celerra File Server in the E-Infostructure," EMC Corporation, Hopkinton, MA, 2000, 9 pages.

"Celerra File Server Architecture for High Availability," EMC Corporation, Hopkinton, MA, 1999, pp. 1-7.

"*MultiProcessor Specification Version 1.4*," May 1997, Intel Corporation, Mt. Prospect, IL, 1993-1997, 1-1 to 5-8, A-1 to E-6.

Helen S. Raizen and Stephen C. Schwarm, "*Building a Semi-Loosely Coupled Multiprocessor System Based on Network Process Extension*," Prime Computer, Inc., Framingham, MA, Pre-Publication Copy, Jan. 29, 1991, pp. 1-17.

Morioka et al., "Design and Evaluation of the High Performance Multi-Processor Server," IEEE International Conference on Computer Design: VLSI in Computers and Processors, IEEE Computer Society Press, Los Alamitos, CA 1994, pp. 66-69.

"Intel Xeon Processor: Unparalleled Value and Flexibility for Small and Medium Business Server Applications," Intel Corporation, Santa Clara, CA, 2002, 4 pages.

"Intel Server Board SE7500WV2;" Intel Corporation, Santa Clara, CA, 2002, 6 pages.

"Building Cutting-Edge Server Applications: Intel Xeon Processor Family Features the Intel NetBurst Microarchitecture with Hyper-Threading Technology;" White Paper, Intel Corporation, Santa Clara, CA, 2002, 10 pages.

Levy & Eckhouse, Jr., *Computer Programming and Architecture—The VAX-11*, Digital Equipment Corporation, Bedford, Mass., 1980, pp. 247-253, 356-360.

Intel 80386 Reference Programmer's Manual, Table of contents (4 pages),Chapter 2.1 Memory Organization and Segmentation (2 pages), Chapter 5 Memory Management (2 pages), Chapter 5.1 Segment Translation (6 pages), Chapter 5.2 Page Translation (4 pages), Chapter 5.3 Combining Segment and Page Translation (3 pages), , http://www7.informatik.uni-erlangen.de, Friederich-Alexander-Universitat, Erlangen-Nurnberg, Germany.

Addendum—Intel Architecture Software Developer's Manual, vol. 3: System Programming Guide, Intel Corp., Santa Clara, CA 1997, pp. 3-1 to 3-4 and 9-1 to 9-8.

The 1A-32 Intel® Architecuter Software Developer's Manual, vol. 3, System Programming Guide, Intel Corp., Santa Clara, CA, 2004, Table of Contents and pp. 3-1 to 3-38.

"PAE36 and Linux Virtual Memory System—The Need for PAE32," www.prism.gatech.edu, Georgia Institute of Technology, Atlanta, Georgia, printed Dec. 5, 2003, 4 pages.

"Windows—Operating System and PAE Support," www.microsoft.com, Microsoft Corp., Bellevue, WA, printed Dec. 5, 2003, 6 pages.

"Physical Address Extension X86 Overview," www.microsoft.com, Microsoft Corp., Bellevue, WA, printed Dec. 5, 2003, 1 page.

"Intel Physical Address Extensions (PAE) in Windows 2000," http://support.microsoft.com, Microsoft Corp., Bellevue, WA, printed Dec. 5, 2003, 1 page.

"PAE Design," www.microsoft.com, Microsoft Corp., Bellevue, WA, printed Dec. 5, 2003, 3 pages.

"PAE Memory and Windows," www.microsoft.com, Microsoft Corp., Bellevue, WA, printed Dec. 5, 2003, 10 pages.

"How to Configure the Paged Address Pool and System Page Table Entry Memory Areas," http://support.microsoft.com, Microsoft Corp., Bellevue, WA, 2003, 4 pages.

"Scaling Out Verses Scaling Up with Intel Physical Addressing Extensions (PAE)," http://support.microsoft.com, Microsoft Corp., Bellevue, WA, printed Dec. 5, 2003, 1 page.

"Physical Address Extension (PAE)—PAE Memory Support," www.osr.com, OSR Open Systems Resources, Inc., Amherst, NH, printed Dec. 5, 2003, 6 pages.

*IA-32 Intel® Architecture Optimization Reference Manual*, Order No. 248966-010, Intel Corporation, 2004, Santa Clara, CA, 2004, pp. 1-28 to 1-34 and 10-1 to 10-44.

"Cookie: Dictionary Entry and Meaning," Webnox Corp., www.hyperdictionary.com, printed Apr. 6, 2004, one page.

"Malloc—A Memory Allocator," The Open Group Specifications Issue 6, IEEE Std 1003.1, www.opengroup.org, printed May 28, 2004, 2 pages.

"Memory Management Reference: Memory Management in Win32®," www.memorymanagement.org, printed May 28, 2004, 1 page.

"Memory Management Reference: Beginner's Guide: Allocation," www.memorymanagement.org, printed May 28, 2004, 4 pages.

"Memory Management Reference: Frequently Asked Questions," www.memorymanagement.org, printed May 28, 2004, 10 pages.

Doug Leo, "A Memory Allocator," Oswego State University of New York, Oswego, NY, www.oswego.edu, printed May 28, 2004, 8 pages.

\* cited by examiner

VIRTUAL SPACE MANAGER FOR COMPUTER HAVING A PHYSICAL ADDRESS EXTENSION FEATURE

LIMITED COPYRIGHT WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates to management of virtual memory for a data processor, and to extension of physical memory beyond a maximum size for virtual memory spaces.

BACKGROUND OF THE INVENTION

Virtual memory is a term applied to memory systems that allow programs to address more memory than is physically available. Disk storage provides the increased memory by storing data that is not currently being accessed. When data in the disk storage is referenced, the operating system moves data resident in memory to the disk storage, and moves the referenced data from the disk storage into memory. This moving of data between memory and disk storage is called demand paging.

One or more translation tables are typically used for translating the virtual address to a corresponding physical address. For example, the virtual address may be subdivided into a segment number that indexes a segment table, a page number that indexes a page table selected by the indexed entry in the segment table, and a byte offset. In this case, the indexed entry in the page table provides a physical page number, and the physical address is the concatenation of the physical page number and the byte offset. To reduce the time for translating virtual addresses to physical addresses, the most recently used virtual-to-physical address translations can be cached in a high-speed associative memory called a translation buffer. See Henry M. Levy and Richard H. Eckhouse, Jr., *Computer Programming and Architecture, The VAX*-11, Digital Equipment Corporation, 1980. pp. 250–253, 358–360.

Recently memory has become so inexpensive that it is often desirable for a processor to access more memory than can be addressed in a given virtual address space. For example, the virtual memory address in many microprocessors is limited to 32 bits, so that the virtual address space has a size of four gigabytes. One technique for permitting a 32-bit virtual address to access more than four gigabytes of physical memory is the physical address extension (PAE) feature introduced in the Intel Pentium Pro processor and included in other Intel P6 processors. The PAE feature provides generic access to a 36-bit physical address space by expanding page-directory and page-table entries to an 8-byte (64 bit) format, and adding a page-directory-pointer table. This allows the extension of the base addresses of the page table and page frames from 20 bits to 24 bits. This increase of four bits extends the physical address from 32 bits to 36 bits.

SUMMARY OF THE INVENTION

In accordance with one aspect, the invention provides a digital computer including at least one processor for producing virtual addresses over a range of virtual addresses, at least one translation buffer coupled to the processor for producing physical addresses from the virtual addresses in accordance with a current virtual-to-physical address mapping, and a random access memory addressed by the physical addresses and coupled to the processor for supplying data to the processor. The random access memory includes physical memory having a range of physical addresses that is greater than the range of virtual addresses. The digital computer is programmed with a plurality of virtual-to-physical address mappings to define a plurality of virtual memory spaces. The digital computer is also programmed with a virtual space manager. The virtual space manager includes an allocation routine for responding to an allocation request from an application for allocation of at least one page of the physical memory by returning an indication of the page of the physical memory. The virtual space manager also includes a mapping routine for responding to a mapping request from the application. The mapping request includes the indication of the page of the physical memory. The mapping routine is executable by the digital computer for switching the current virtual-to-physical address mapping to a virtual-to-physical address mapping including the indicated page of the physical memory.

In accordance with another aspect, the invention provides a digital computer. The digital computer includes at least one processor for producing virtual addresses over a range of virtual addresses, at least one translation buffer coupled to the processor for producing physical addresses from the virtual addresses in accordance with a current virtual-to-physical address mapping, and a random access memory including physical memory. The random access memory is addressed by the physical addresses and is coupled to the processor for supplying data to the processor. The digital computer is programmed with a virtual space manager. The virtual space manager includes a registration routine for responding to a registration request from an application program. The registration request specifies a virtual space size. The registration routine responds to the registration request by returning to the application an identification of the application. The virtual space manager further includes an allocation routine for responding to an allocation request from the application. The allocation request specifies the identification of the application. The allocation routine responds to the allocation request by allocating a portion of the physical memory having the virtual space size that was specified in the registration request, and by returning to the application a cookie identifying the allocated portion of the physical memory. The virtual space manager also includes a mapping routine for responding to a mapping request from the application. The mapping request specifies the identification of the application and the cookie. The mapping routine responds to the mapping request by setting the current virtual-to-physical address mapping to map between a virtual space having the virtual space size that was specified in the registration request, and the allocated portion of the physical memory.

In accordance with another aspect, the invention provides a digital computer including at least one processor for producing virtual addresses over a range of virtual addresses, at least one translation buffer coupled to the processor for producing physical addresses from the virtual addresses in accordance with a current virtual-to-physical address mapping, and a random access memory including physical memory. The random access memory is addressed by the physical addresses and is coupled to the processor for supplying data to the processor. The digital computer is programmed with a virtual space manager. The virtual space manager includes a registration routine for responding to a registration request from an application. The registration request specifies a virtual address and a virtual space size. The registration routine responds to the registration request by returning to the application an identification of the application: The virtual space manager also includes an allocation routine for responding to an allocation request from the application. The allocation request specifies the identification of the application. The allocation routine responds to the allocation request by allocating a portion of the physical memory having the virtual space size that was specified in the registration request, and by returning to the application a cookie identifying the allocated portion of the physical memory. The virtual space manager further includes a mapping routine for responding to a mapping request from the application. The mapping request specifies the identification of the application and the cookie. The mapping routine responds to the mapping request by setting the current virtual-to-physical address mapping to map between the virtual address that was specified in the registration request and the allocated portion of the physical memory.

In accordance with yet another aspect, the invention provides a method of operating a digital computer. The digital computer has at least one processor for producing virtual addresses over a range of virtual addresses, at least one translation buffer coupled to the processor for producing physical addresses from the virtual addresses in accordance with a current virtual-to-physical address mapping, and a random access memory being addressable by the physical addresses and coupled to the processor for supplying data to the processor. The random access memory contains physical memory having a range of physical addresses that is greater than the range of virtual addresses. The digital computer is programmed with a plurality of virtual-to-physical address mappings to define a plurality of virtual memory spaces. The method includes the digital computer responding to an allocation request from an application for allocation of at least one page of memory by returning an indication of the page of allocated memory in a virtual memory space. The method also includes the digital computer responding to a mapping request from the application. The mapping request includes the indication of the page of allocated memory. The digital computer responds to the mapping request by switching the current virtual-to-physical address mapping to the virtual memory space including the indicated page of allocated memory.

In accordance with still another aspect, the invention provides a method of operating a digital computer. The digital computer includes at least one processor for producing virtual addresses over a range of virtual addresses, at least one translation buffer coupled to the processor for producing physical addresses from the virtual addresses in accordance with a current virtual-to-physical address mapping, and a random access memory including physical memory. The random access memory is addressable by the physical addresses and is coupled to the processor for supplying data to the processor. The method includes the digital computer responding to a registration request from an application. The registration request specifies a virtual space size. The digital computer responds to the registration request by returning to the application an identification of the application. The method further includes the digital computer responding to an allocation request from the application. The allocation request specifies the identification of the application. The digital computer responds to the allocation request by allocating a portion of the physical memory having the virtual space size that was specified by the application in the registration request, and by returning to the application a cookie identifying the allocated portion of the physical memory. The method also includes the digital computer responding to a mapping request from the application. The mapping request specifies the identification of the application and the cookie. The digital computer responds to the mapping request by setting up the current virtual-to-physical address mapping to map between a virtual space having the virtual space size that was specified by the application in the registration request, and the allocated portion of the physical memory.

In accordance with yet still another aspect, the invention provides a method of operating a digital computer. The digital computer includes at least one processor for producing virtual addresses over a range of virtual addresses, at least one translation buffer coupled to the processor for producing physical addresses from the virtual addresses in accordance with a current virtual-to-physical address mapping, and a random access memory including physical memory. The random access memory is addressable by the physical addresses and is coupled to the processor for supplying data to the processor. The method includes the digital computer responding to a registration request from an application. The registration request specifies a virtual address and a virtual space size. The digital computer responds to the registration request by returning to the application an identification of the application. The method also includes the digital computer responding to an allocation request from the application. The allocation request specifies the identification of the application. The digital computer responds to the allocation request by allocating a portion of the physical memory having the virtual space size previously specified by the application in the registration request, and by returning to the application a cookie identifying the allocated portion of the physical memory. The method further includes the digital computer responding to a mapping request from the application. The mapping request specifies the identification of the application and the cookie. The digital computer responds to the mapping request by setting up the current virtual-to-physical address mapping to map between the virtual address that was specified by the application in the registration request and the allocated portion of the physical memory.

BRIEF DESCRIPTION OF THE DRAWINGS

Additional features and advantages of the invention will be described below with reference to the drawings, in which.

Figure 1:
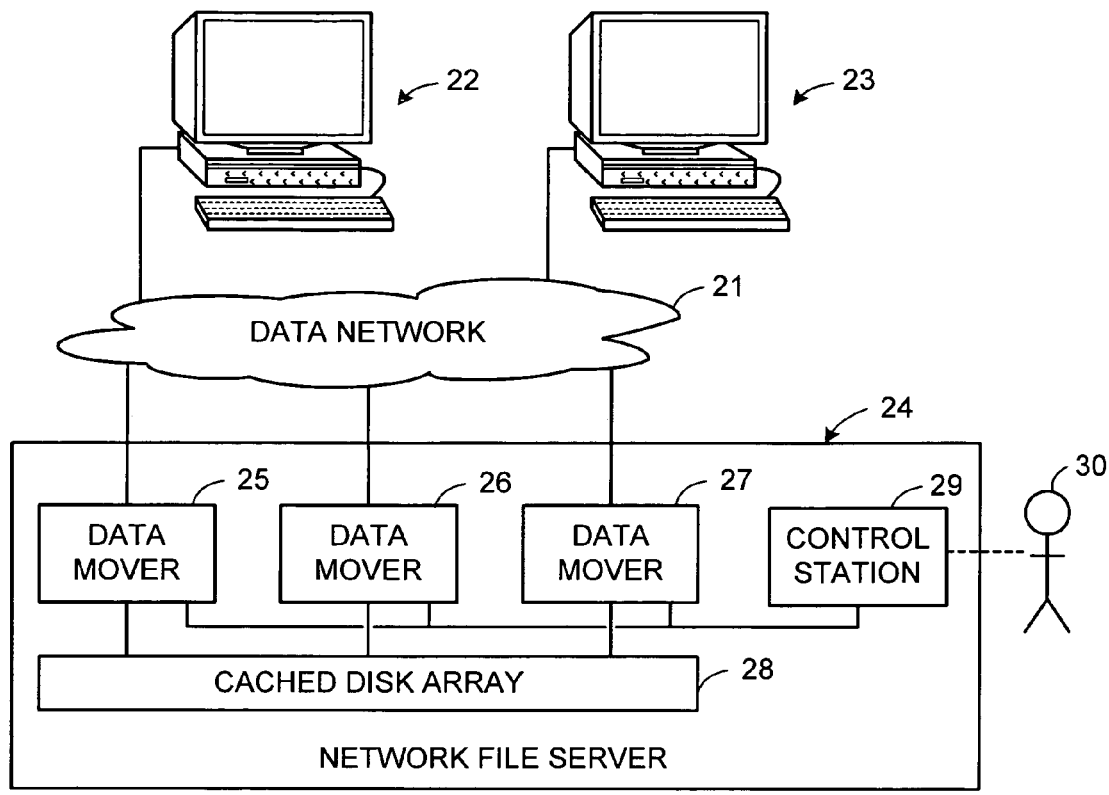
FIG. 1 is a block diagram of a data network including clients that share a network file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system incorporating the present invention. The data processing system includes a data network 21 interconnecting a number of clients 22, 23 and servers such as a network file server 24. The data network 21 may include any one or more of network connection technologies, such as Ethernet or Fibre Channel, and communication protocols, such as TCP/IP or UDP. The clients 22, 23, for example, are workstations such as personal computers. Various aspects of the network file server 24 are further described in Vahalia et al., U.S. Pat. No. 5,893,140 issued Apr. 6, 1999, incorporated herein by reference, and Xu et al., U.S. Pat. No. 6,324,581, issued Nov. 27, 2002, incorporated herein by reference. Such a network file server is manufactured and sold by EMC Corporation, 176 South Street, Hopkinton, Mass. 01748.

The network file server 24 includes a cached disk array 28 and a number of data mover computers 25, 26, 27. The network file server 24 is managed as a dedicated network appliance, integrated with popular network operating systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server.

Figures 2, 8:
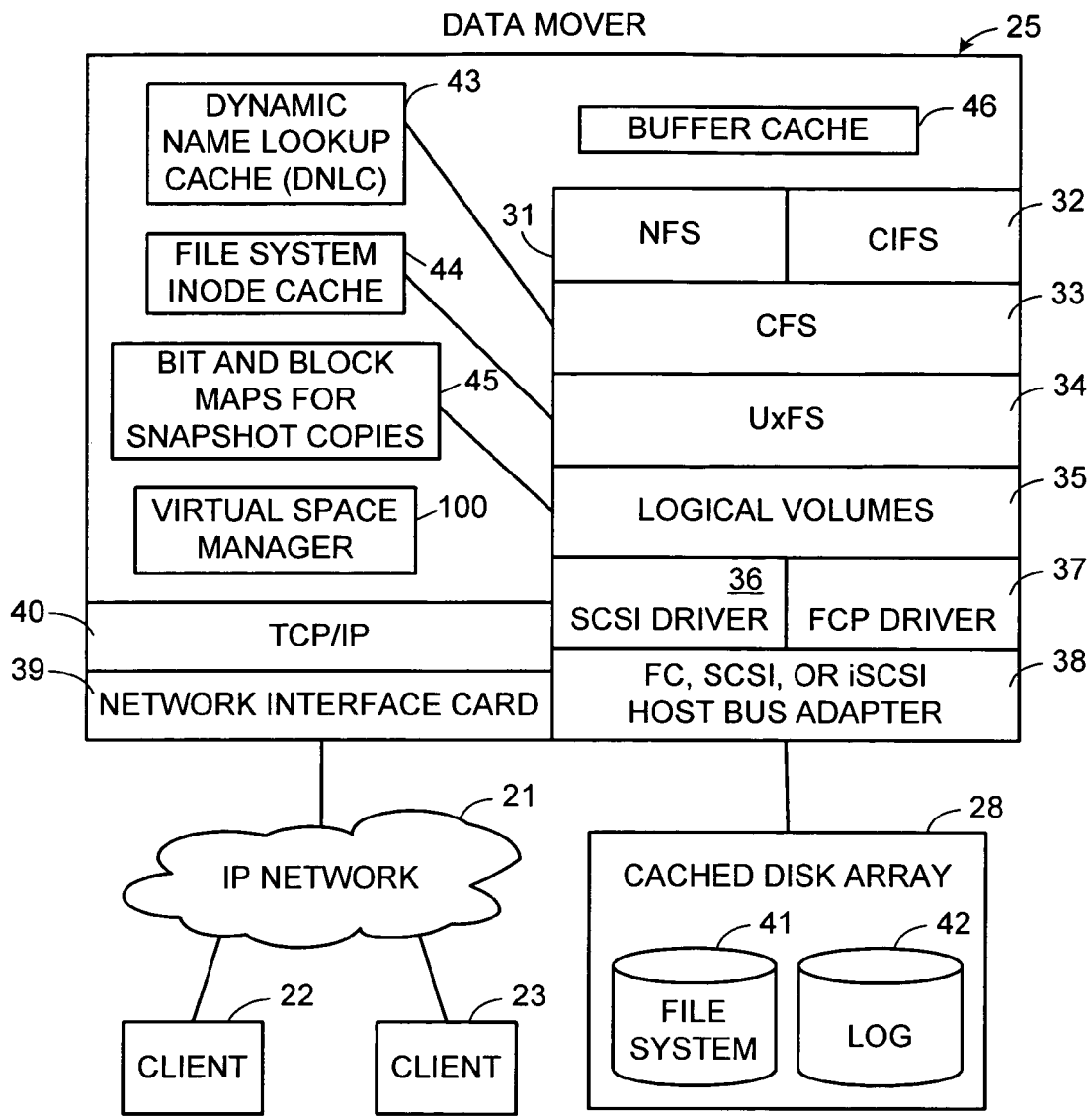
FIG. 2 shows details of a data mover in the data network of FIG. 1.
FIG. 8 shows a block map for a snapshot copy.

FIG. 2 shows software modules in the data mover 25 introduced in FIG. 1. The data mover 25 has a network file system (NFS) module 31 for supporting communication among the clients and the data movers of FIG. 1 over the IP network 21 using the NFS file access protocol, and a Common Internet File System (CIFS) module 32 for supporting communication over the IP network using the CIFS file access protocol. The NFS module 31 and the CIFS module 32 are layered over a Common File System (CFS) module 33, and the CFS module is layered over a Universal File System (UxFS) module 34. The UxFS module supports a UNIX-based file system, and the CFS module 33 provides higher-level functions common to NFS and CIFS. The UxFS module 34 maintains a file system inode cache 44.

For supporting NFS access, the CFS module 33 maintains a global cache 43 of directory pathname components, which is called the dynamic name lookup cache (DNLC). The DNLC does file system pathname to file handle translation. Each DNLC entry contains a directory or file name and a reference to the inode cache. If there is a cache miss upon lookup in the DNLC, then directory entries must be read from the file system inode cache 44 or the file system 41 on disk and scanned to find the named directory or file. If the DNLC is too small, then lots of processing time will be used up searching the inodes for the named directory or file.

The UxFS module 34 accesses data organized into logical volumes defined by a module 35. Each logical volume maps to contiguous logical storage addresses in the cached disk array 28. The module 35 maintains bit and block maps 45 for snapshot copies, as further described below with reference to FIGS. 8 to 11. The module 35 is layered over an SCSI driver 36 and a Fibre-channel protocol (FCP) driver 37. The data mover 25 sends storage access requests through a host bus adapter 38 using the SCSI protocol, the iSCSI protocol, or the Fibre-Channel protocol, depending on the physical link between the data mover 25 and the cached disk array 28. To enable recovery of the file system 41 to a consistent state after a system crash, the UxFS layer 34 writes file metadata to a log 42 in the cached disk array 28 during the commit of certain write operations to the file system 41.

A network interface card 39 in the data mover 25 receives IP data packets from the IP network. A TCP/IP module 40 decodes data from the IP data packets for the TCP connection and stores the data in buffer cache 46. For example, the UxFS layer 34 writes data from the buffer cache 46 to the file system 41 in the cached disk array 28. The UxFS layer 34 also reads data from the file system 41 or a file system cache 44 and copies the data into the buffer cache 46 for transmission to the network clients 22, 23.

In accordance with an aspect of the invention, the data mover 25 is programmed with a virtual space manager 100 for dynamic allocation of virtual memory pages that are mapped to physical memory using a physical address extension (PAE) feature. The virtual space manager 100 will be further described below with reference to FIGS. 12 to 19.

High performance microprocessors for the data movers 25, 26, 27 presently have virtual addresses limited to 32 bits, for a four gigabyte address space. Yet the cost of random access memory has decreased to the point where it is desirable to use more than four gigabytes of physical memory in order to increase data mover performance. For example, file access speed can be increased by increasing the size of the DNLC in order to increase the DNLC hit rate, and processing time for making and accessing snapshot copies can be decreased by increasing the random access memory allocated to the bit and block maps in order to reduce delays for demand paging of the bit and block maps between random access memory and disk storage.

Figure 3:
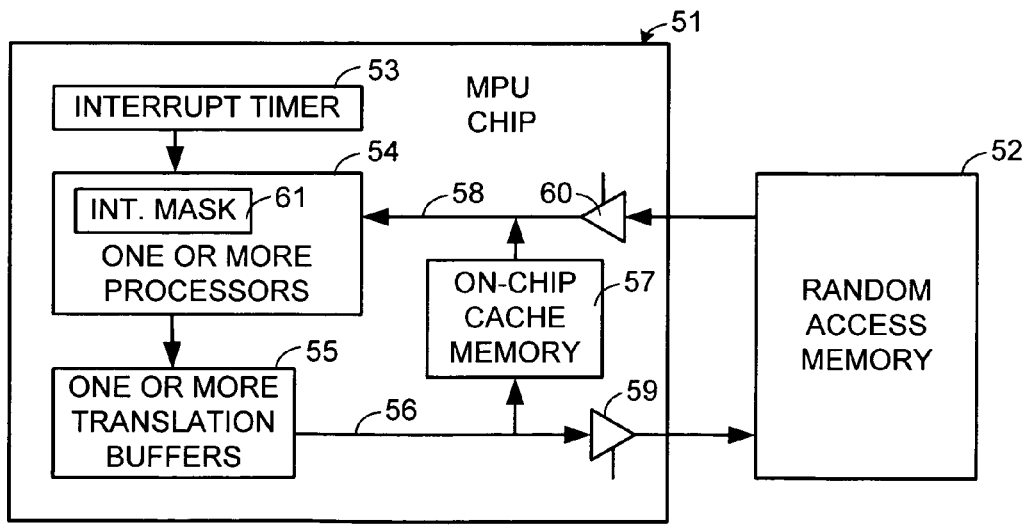
FIG. 3 is a block diagram of a microprocessor chip in connection with random access memory as used in the data mover of FIG. 2.

One technique for permitting a 32-bit virtual address to access more than four gigabytes of physical memory is the physical address extension (PAE) feature introduced in the Intel Pentium Pro processor and included in other Intel P6 processors. For example, FIG. 3 shows a block diagram of a microprocessor chip 51 in connection with a random access memory 52. The microprocessor chip 51 includes an interrupt timer, one or more processors 54, one or more translation buffers 55, a physical address bus 56, an on-chip cache memory 57, a data bus 58, an address buffer 59, and a data buffer 60.

The microprocessor chip 51 may have multiple logical or physical processors 54. For example, the Intel Xeon processor has two logical processors 54, each of which has a separate set of processor registers. The Intel Xeon processor has a translation buffer for instruction addresses and another translation buffer for data addresses, and the translation buffers 55 are shared between the two logical processors by including, in each translation buffer entry, a logical processor ID bit to distinguish whether the entry belongs to one logical processor or the other. In a data processing system having multiple physical processors, each physical processor is typically provided with one or more translation buffers that are not shared with the other physical processors.

The interrupt timer 53 periodically interrupts each processor 54 in order to interrupt of a current code thread in order to begin execution of a real-time scheduler code thread. For example, the timer interrupt occurs every 20 milliseconds. Each processor has an interrupt mask 61 in which a bit can be set to enable or cleared to disable the interruption by the interrupt timer.

Each processor 54 produces linear addresses. If a paging feature is turned on, the linear addresses are treated as virtual addresses, which are translated into physical addresses for addressing the random access memory 52. A translation buffer 55 attempts to find a physical address translation for each virtual address. If the translation buffer does not contain a physical address translation for a given virtual address, then the processor performs a physical address translation by accessing a series of translation tables as shown and described further below with reference to FIG. 4. The processor then puts the physical address translation into the translation buffer 55 and the translation buffer 55 asserts the physical address onto the address bus 56.

If the addressed data are found in the on-cache data cache 57, then the on-chip data cache 57 asserts the data onto the data bus 58 and the data is supplied from the data bus 58 to the processor 54. Otherwise, if the addressed data are not in the on-chip data cache 57, then an address buffer 59 supplies the physical address from the address bus 56 to the random access memory 52, and a data buffer 60 receives the data from the random access memory 52 and transmits the data over the data bus 58 to the processor 54.

Figure 4:
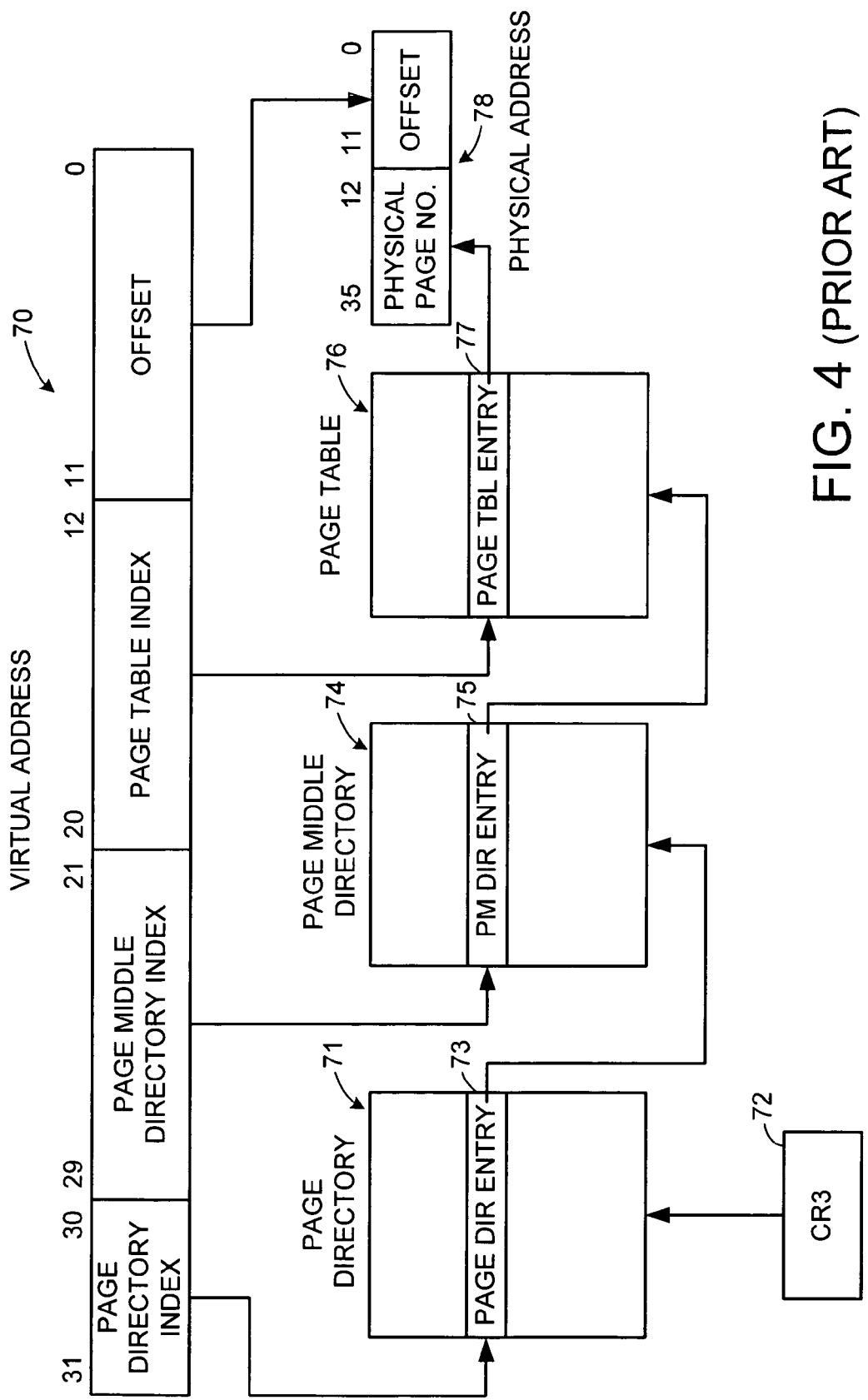
FIG. 4 is a flow diagram for virtual-to-physical address translation in the microprocessor chip of FIG. 3.

FIG. 4 shows the translation of a 32 bit virtual address 70 into a 36 bit physical address in an Intel microprocessor using Intel's physical address extension (PAE). The translation process involves accessing a series of translation tables including a page directory 71 having four entries, a page middle directory 74 having 512 entries, and a page table 76 having 512 entries. The virtual address 70 is subdivided into a two-bit page directory index (bits 30 to 31 of the virtual address), a nine-bit page middle directory index (bits 21 to 29 of the virtual address), a nine-bit page table index (bits 12 to 20 of the virtual address), and a 12-bit offset (bits 0 to 11 of the virtual address).

A processor control register 72 designated "CR3" provides a base address for addressing the page directory 71. In a data mover having multiple processors, each processor has a processor "CR3" so that at any given time, each processor may be using a different virtual address space. The indexed entry of the page directory 71 provides a 24-bit base address for addressing the page middle directory 74. The indexed entry of the page middle directory 74 provides a 24-bit base address for addressing the page table 76. The indexed entry of the page table 76 provides a physical page number appearing as bits 12 to 35 of the translated physical address 78. The offset in the virtual address appears as bits 0 to 11 of the physical address. Therefore, a virtual-to-physical address translation requires three successive table lookups, unless the translation can be found in the translation buffer.

It has been found that the three levels of indirection in the address translation of a physical address extension (PAE) feature of a processor may cause a loss of performance unless there is an appropriate assignment of virtual memory spaces to well-defined or well-contained software modules executed by the processor. Otherwise, there will be a relatively high frequency of translation buffer misses. In addition, mapping chunks of both common and separate physical address to each of the virtual memory spaces enhances performance by providing efficient communication of parameters to and results from the well-defined or well-contained software modules. For example, a well-defined and well-contained software module performs tasks that have been defined so that memory access during execution of the software module is contained within an assigned one of the available virtual address spaces provided by the PAE feature.

Figure 5:
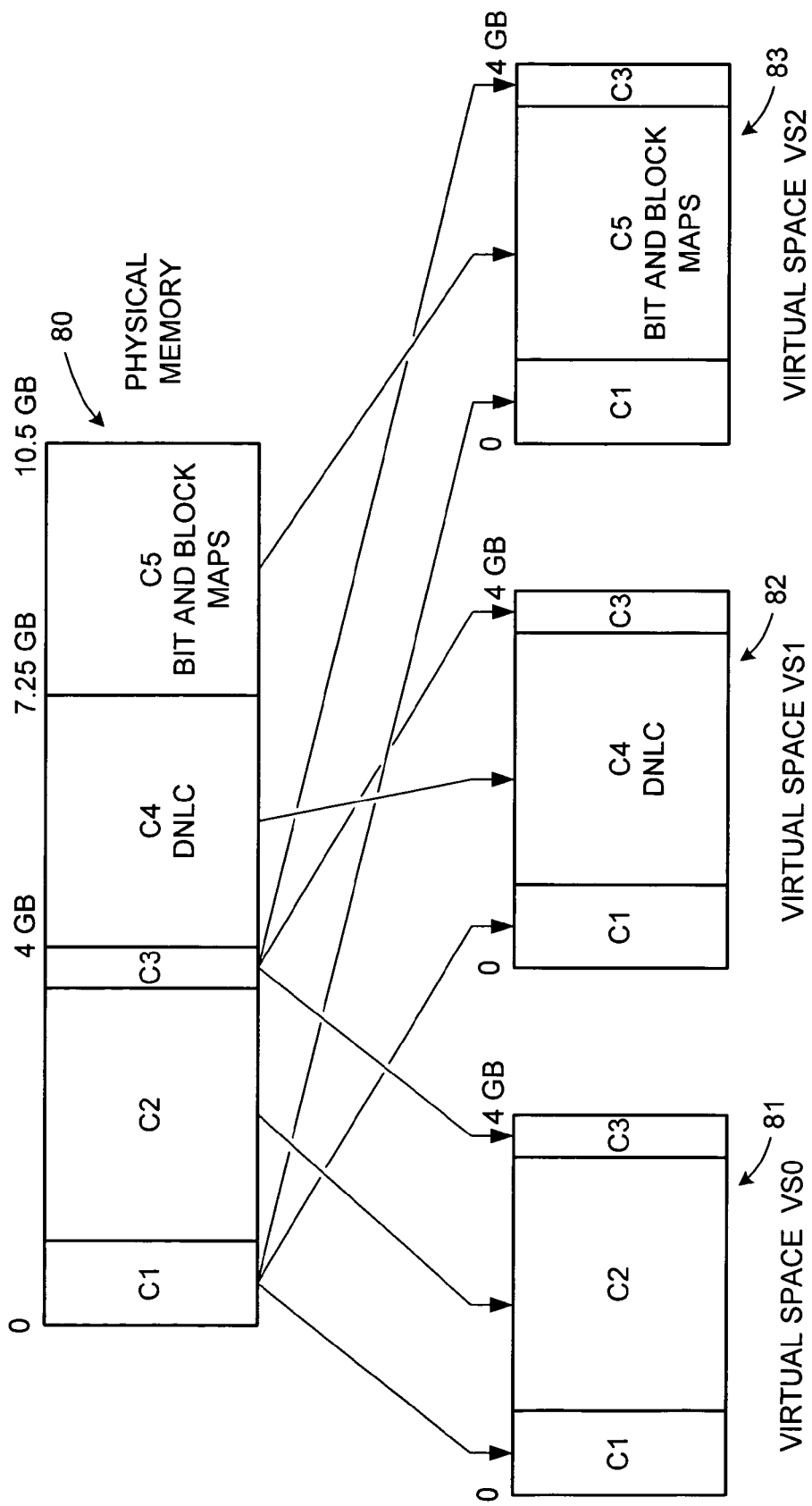
FIG. 5 shows the mapping of multiple virtual address spaces into physical memory for the data mover of FIG. 2.
Figure 6:
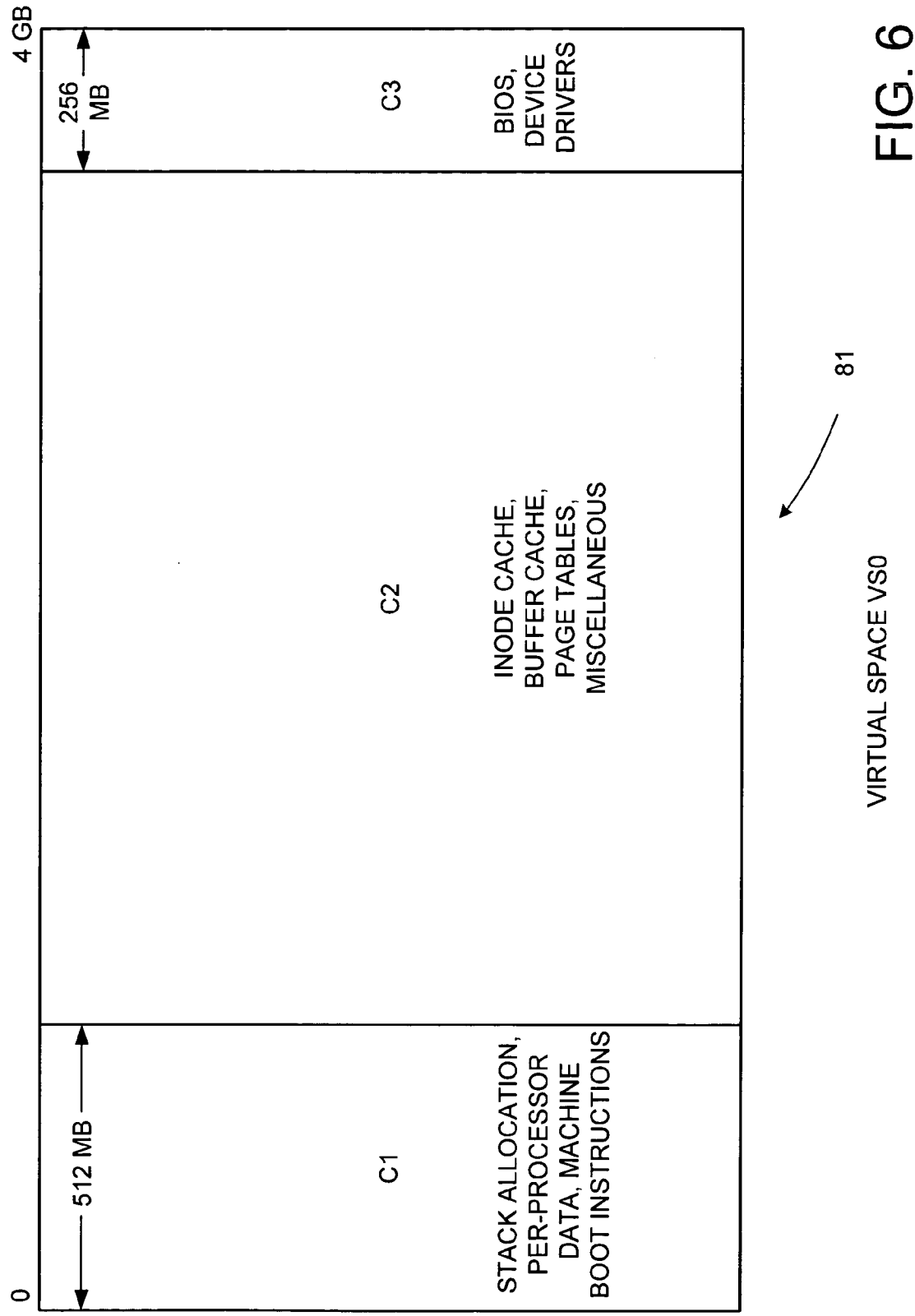
FIG. 6 shows a first one of the virtual address spaces in greater detail.

FIGS. 5 and 6, for example, shows a preferred allocation of physical memory chunks to three virtual address spaces for the data mover software introduced in FIG. 2. The physical memory 80 includes a first chunk C1 starting at physical address zero and containing 512 megabytes. This bottom chunk C1 is used for processor stack allocation, per-processor data, and machine boot instructions. The next higher chunk is a second chunk C2 used for the file system inode cache (44 in FIG. 2), the buffer cache (46 in FIG. 2), page tables, and miscellaneous data mover functions. This chunk contains 3.25 gigabytes of physical memory. Unlike a server using a Microsoft operating system, the data movers need not distinguish between user memory space and kernel or operating system memory space. The next higher chunk is chunk C3 containing 256 megabytes at the top of the first four gigabytes of the physical memory 80. The chunk C3 contains BIOS and device drivers. The next higher chunk is chunk C4, which contains the memory for the DNLC (43 in FIG. 2). This chunk C4 contains 3.25 gigabytes of physical memory. The highest chunk is C5, which contains the memory for the bit and block maps for snapshot copies. This highest chunk C5 also contains 3.25 gigabytes of physical memory.

As shown in FIG. 5, the PAE feature maps the physical memory 80 to a first virtual memory space VS0 81, a second virtual memory space VS1 82, and a third virtual memory space VS2 83. Each of these three virtual memory spaces contains four gigabytes of memory. The lower 512 megabytes of each of these three virtual memory spaces is mapped to the same chunk C1. The upper 256 megabytes of each of these three virtual memory spaces is mapped to the same chunk C3. The middle 3.25 gigabytes of the first virtual memory space 81 is mapped to the chunk C2. The middle 3.25 gigabytes of the second virtual memory space 82 is mapped to the chunk C4 for the DNLC. All of the DNLC objects such as the hash and DNLC cache entries are created in the chunk C4. The middle 3.25 gigabytes of the third virtual memory space 83 is mapped to the chunk C5 for the bit and block maps for snapshot copies.

By offloading the memory for the DNLC and the bit and block maps from C2, more memory becomes available to the buffer cache, and the DNLC hash setting can be more aggressive in order to improve performance.

The mapping as shown in FIG. 5 is obtained by disabling paging (so that the physical address is the same as the virtual address) when accessing the first virtual address space, and by programming a number of page directories, page middle directories, and page tables for accessing the second and third virtual address spaces when paging is enabled. For example, there are two page directories, one for each of the second and third virtual address spaces. The first virtual address space is directly mapped to the bottom portion of the physical memory, and the virtual-to-physical address translation can be switched between the other virtual spaces by switching the page directory base address in CR3. There are eight page middle directories, four for each of the second and third virtual address spaces. There could be 4,096 page tables, 2048 for each of the second and third virtual address spaces. The page numbers simply could be listed in a linear fashion in the page table entries, with jumps occurring from virtual address 512M-1 to 512M and from virtual addresses 4G-256M-1 to 4G-256M. In this case there would be page tables identical in content for translating the virtual addresses to most of the physical addresses in the chunks C1 and C2 so these page tables could be shared for translation among the second and third virtual spaces for a reduction in the required number of page tables.

Figure 7:
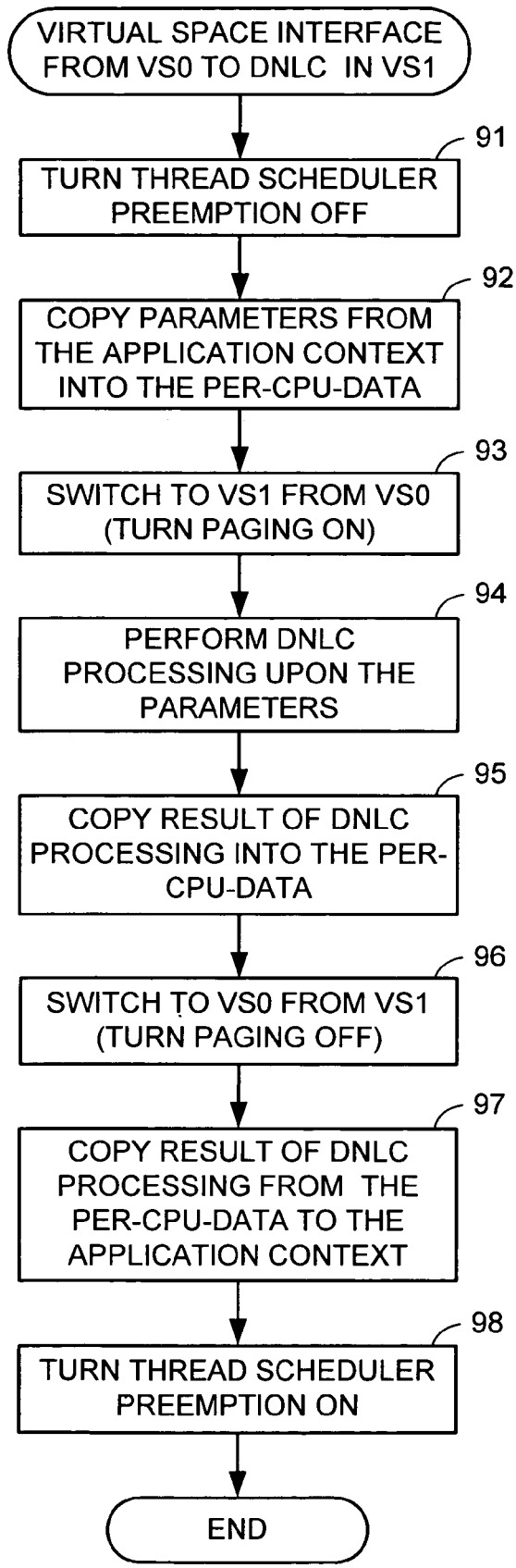
FIG. 7 shows a method of operating the data mover of FIG. 2 for switching between the first one of the virtual address spaces and a second one of the virtual address spaces in order to access a domain name lookup cache (DNLC)

FIG. 7 shows a method of operating the data mover of FIG. 2 for switching between the first virtual address space and the second virtual address space in order to access the domain name lookup cache (DNLC). In a first step 91, thread scheduler preemption is turned off. Once thread scheduler preemption is turned off, if a timer interrupt should happen to occur, the thread scheduler will not suspend execution of the routine of FIG. 7 in order to execute another application thread until the thread scheduler preemption is turned on in step 98. For example, in a data mover, the thread scheduler will not preempt an application thread if the application thread holds one or more spinlocks. A count is kept for each processor of the number of spinlocks held by the application thread currently being executed by the processor. The count is incremented when the current thread begins to acquire a spinlock, and the count is decremented with the current thread releases a spinlock. The thread scheduler compares this count to zero in order to deny preemption if the count is greater than zero. Preemption is turned off by incrementing this count, and preemption is turned back on by decrementing this count.

In step 92, parameters are copied from an application context (running in chunk C2 in the first virtual address space VS0) to the per-processor data region in chunk C1.

In step 93, the virtual-to-physical address translation is switched to VS1 from VS0. For example, when executing applications in VS0, demand paging is turned off, so that the physical address is the same as the virtual address. To switch to VS1, the control register CR3 can be tested to see if it contains the base address of the page directory for VS1, and if so, demand paging is simply turned on. If the control register CR3 does not contain the base address of the page directory for VS1, then CR3 is loaded with the base address of the page directory for VS1 and the translation buffer is flushed of the virtual addresses from 512M to 4G-256M-1, and demand paging is turned on.

In step 94, the microprocessor performs DNLC processing, for example, to find the inode number of a file having a given path name by successive lookups in the DNLC cache. In step 95, the result of the DNLC processing (such as the desired inode number) is copied into the per-processor data region of chunk C1. Because the parameters and results are exchanged through the per-processor data region, there can be as many concurrent accesses to the DNLC as there are processors in the data mover. In step 96, the microprocessor switches back to VS0 from VS1 by turning off demand paging. In step 97, the microprocessor copies the result of the DNLC processing from the per-processor data region to the application context. Finally, in step 98, the thread scheduler preemption is turned on.

In some situations, it may be desirable to switch between two higher virtual address spaces such as VS1 and VS2. This could be done by setting the control register CR3 to the base address of the page directory for VS2, and flushing the translation buffer of virtual addresses from 512M to 4G-256M-1.

It would be possible to offload a well-defined or well-contained software module from C2 to more than one virtual address space. For example, an additional four-gigabyte virtual space VS3 could be allocated to the bit and block maps for snapshot copies. Additional well-defined or well-contained software modules could be offloaded from VS0 to additional virtual spaces. For example, the UxFS hashing and inode cache could be offloaded to an additional four-gigabyte virtual space VS4.

FIGS. 8 to 11 show basic features of the snapshot copy software. The snapshot copy software retains and identifies changes made to a logical volume of data storage. For example, the present state of a file system is stored in a "clone volume," and old versions of the logical blocks that have been changed in the clone volume are saved in a "save volume". In order to conserve storage, the logical blocks of the save volume are dynamically allocated to the old versions of the changed blocks as the changes are made to the clone volume.

As shown in FIG. 8, for each logical block that has been changed in the clone volume, a block map 480 identifies the logical block address ($S_i$) of the old version of the block in the save volume and the corresponding logical block address ($B_i$) of the changed block in the clone volume.

Figure 9:
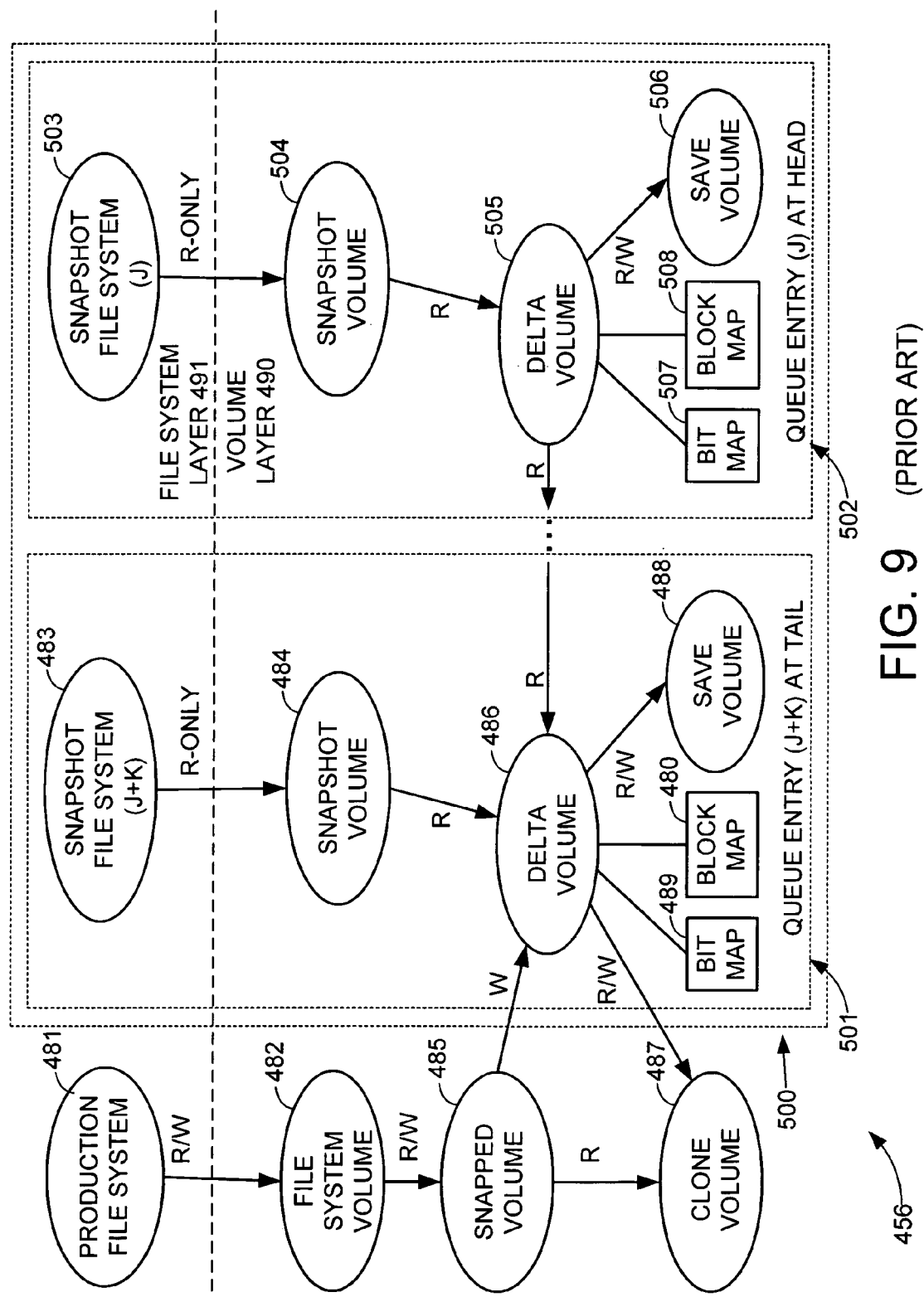
FIG. 9 shows a snapshot copy facility.

FIG. 9 shows details of the snapshot copy software 456, which provides multiple snapshots 483, 503 of a production file system 481. The content of each snapshot file system 483, 503 is the state of the production file system 481 at a particular point in time when the snapshot was created. The snapshot copy software 456 provides a hierarchy of objects in a volume layer 490 supporting the file systems in a file system layer 491. The production file system 481 is supported by read/write access to a file system volume 482. Each snapshot file system 483, 503 provides read-only access to a respective snapshot volume 484, 504.

Additional objects in the volume layer 490 of FIG. 9 permit the content of each snapshot file system to be maintained during concurrent read/write access to the production file system 481. The file system volume 482 is supported by a snapped volume 485 having read access to a clone volume 487 and write access to a delta volume 486. The delta volume 486 has read/write access to the clone volume 487 and read/write access to a save volume 488.

In the organization of FIG. 9, the actual data is stored in blocks in the clone volume 487 and a respective save volume 488, 506 in storage for each snapshot. The delta volume 486 also accesses information stored in a bit map 489 and the block map 480. The bit map 489 indicates which blocks in the clone volume 487 have prior versions in the save volume 488. In other words, for read-only access to the snapshot file system, the bit map 489 indicates whether the delta volume should read each block from the clone volume 487 or from the save volume 488. For example, the bit map is stored in memory and it includes a bit for each block in the clone volume 487. The bit is clear to indicate that there is no prior version of the block in the save volume 488, and the bit is set to indicate that there is a prior version of the block in the save volume 488.

Consider, for example, a production file system 481 having blocks a, b, c, d, e, f, g, and h. Suppose that when the snapshot file system 483 is created, the blocks have values a0, b0, c0, d0, e0, f0, g0, and h0. Thereafter, read/write access to the production file system 481 modifies the contents of blocks a and b, by writing new values a1 and b1 into them. At this point, the following contents are seen in the clone volume 487 and in the save volume 488:

Clone Volume: a1, b1, c0, d0, e0, f0, g0, h0
Save Volume: a0, b0

From the contents of the clone volume 487 and the save volume 488, it is possible to construct the contents of the snapshot file system 483. When reading a block from the snapshot file system 483, the block is read from the save volume 488 if found there, else it is read from the clone volume 487.

FIG. 9 further shows that a snapshot queue 500 maintains respective objects supporting multiple snapshot file systems 483, 503 created at different respective points in time from the production file system 481. In particular, the snapshot queue 500 includes a queue entry (J+K) at the tail 501 of the queue, and a queue entry (J) at the head 502 of the queue. In this example, the snapshot file system 483, the snapshot volume 484, the delta volume 486, the save volume 488, the bit map 489, and the block map 480 are all located in the queue entry at the tail 501 of the queue. The queue entry at the head of the queue 502 includes similar objects; namely, the snapshot file system (J) 503, a snapshot volume 504, a delta volume 505, a save volume 506, a bit map 507, and a block map 508.

The snapshot copy software 456 may respond to a request for another snapshot of the production file system 481 by allocating the objects for a new queue entry, and inserting the new queue entry at the tail of the queue, and linking it to the snapped volume 485 and the clone volume 487. In this fashion, the save volumes 488, 506 in the snapshot queue 500 are maintained in a chronological order of the respective points in time when the snapshot file systems were created. The save volume 506 supporting the oldest snapshot file system 503 resides at the head 502 of the queue, and the save volume 488 supporting the youngest snapshot file system 483 resides at the tail 501 of the queue.

Figure 10:
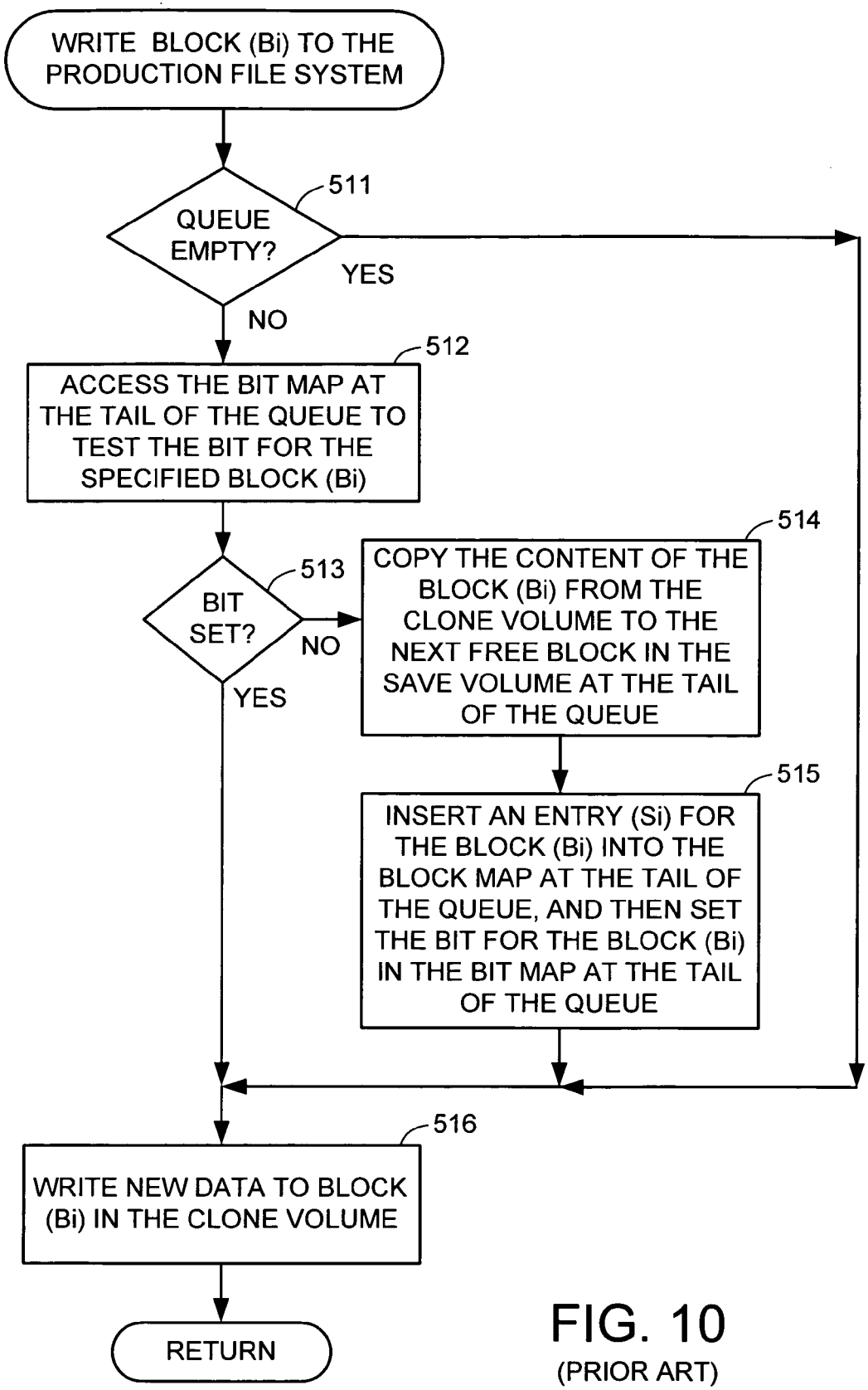
FIG. 10 is a flowchart of a procedure for writing a specified block to a production file system in the snapshot copy facility of FIG. 9.

FIG. 10 shows a routine in the snapshot copy software for writing a specified block ($B_i$) to the production file system. In step 511, if the snapshot queue is not empty, execution continues to step 512. In step 512, the bit map at the tail of the snapshot queue is accessed in order to test the bit for the specified block ($B_i$). Then in step 513, if the bit is not set, execution branches to step 514. In step 514, the content of the specified block ($B_i$) is copied from the clone volume to the next free block in the save volume at the tail of the snapshot queue. Execution continues from step 514 to step 515. In step 515, the save volume block address ($S_i$) of the free block is inserted into the entry for the block ($B_i$) in the block map at the tail of the queue, and then the bit for the block ($B_i$) is set in the bit map at the tail of the queue. After step 515, execution continues to step 516. Execution also continues to step 516 from step 513 if the tested bit is found to be set. Moreover, execution continues to step 516 from step 511 if the snapshot queue is empty. In step 516, new data is written to the specified block ($B_i$) in the clone volume, and then execution returns.

Figure 11:
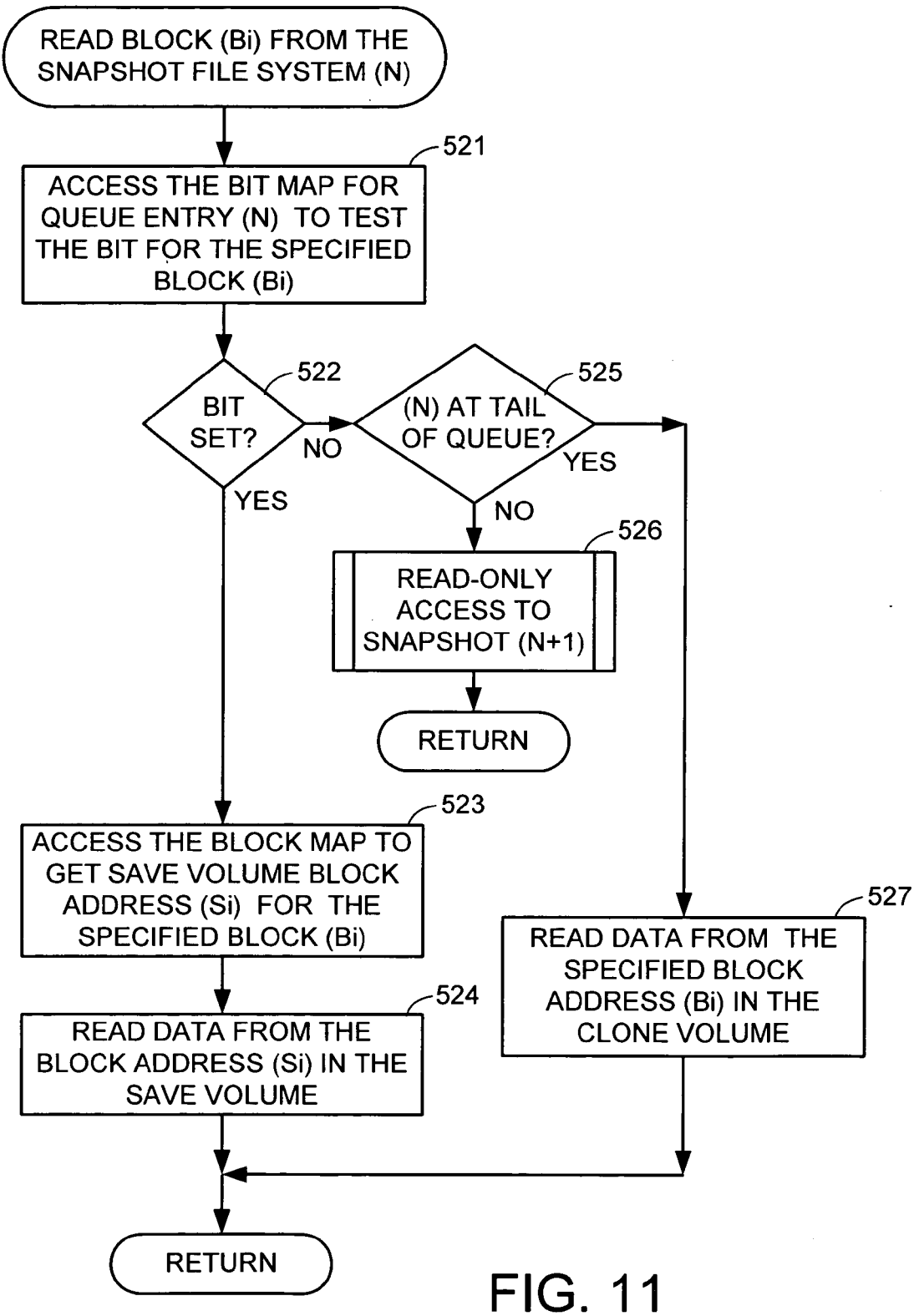
FIG. 11 is a flowchart of a procedure for reading a specified block from a specified snapshot version in the snapshot copy facility of FIG. 9.

FIG. 11 shows a routine in the snapshot copy software for reading a specified block ($B_i$) from a specified snapshot file system (N). In the first step 521, the bit map is accessed for the queue entry (N) to test the bit for the specified block ($B_i$). Then in step 522, if the tested bit is set, execution continues to step 523. In step 523, the block map is accessed to get the save volume block address ($S_i$) for the specified block ($B_i$). Then in step 524 the data is read from the block address ($S_i$) in the save volume, and then execution returns.

If in step 522 the tested bit is not set, then execution branches to step 525. In step 525, if the specified snapshot (N) is not at the tail of the snapshot queue, then execution continues to step 526 to perform a recursive subroutine call upon the subroutine in FIG. 11 for read-only access to the snapshot (N+1). After step 526, execution returns.

If in step 525 the snapshot (N) is at the tail of the snapshot queue, then execution branches to step 527. In step 527, the data is read from the specified block ($B_i$) in the clone volume, and execution returns.

Additional details regarding the construction and operation of a snapshot copy facility are found in Philippe Armangau U.S. Patent Application Publication No. US 2004/0030951 A1 published Feb. 12, 2004; Armangau et al. U.S. Patent Application Publication No. US 2004/0030846 A1 published Feb. 12, 2004; and Armangau et al. U.S. Patent Application Publication No. US 2004/0030727 A1 published Feb. 12, 2004, all of which are incorporated herein by reference.

Figure 12:
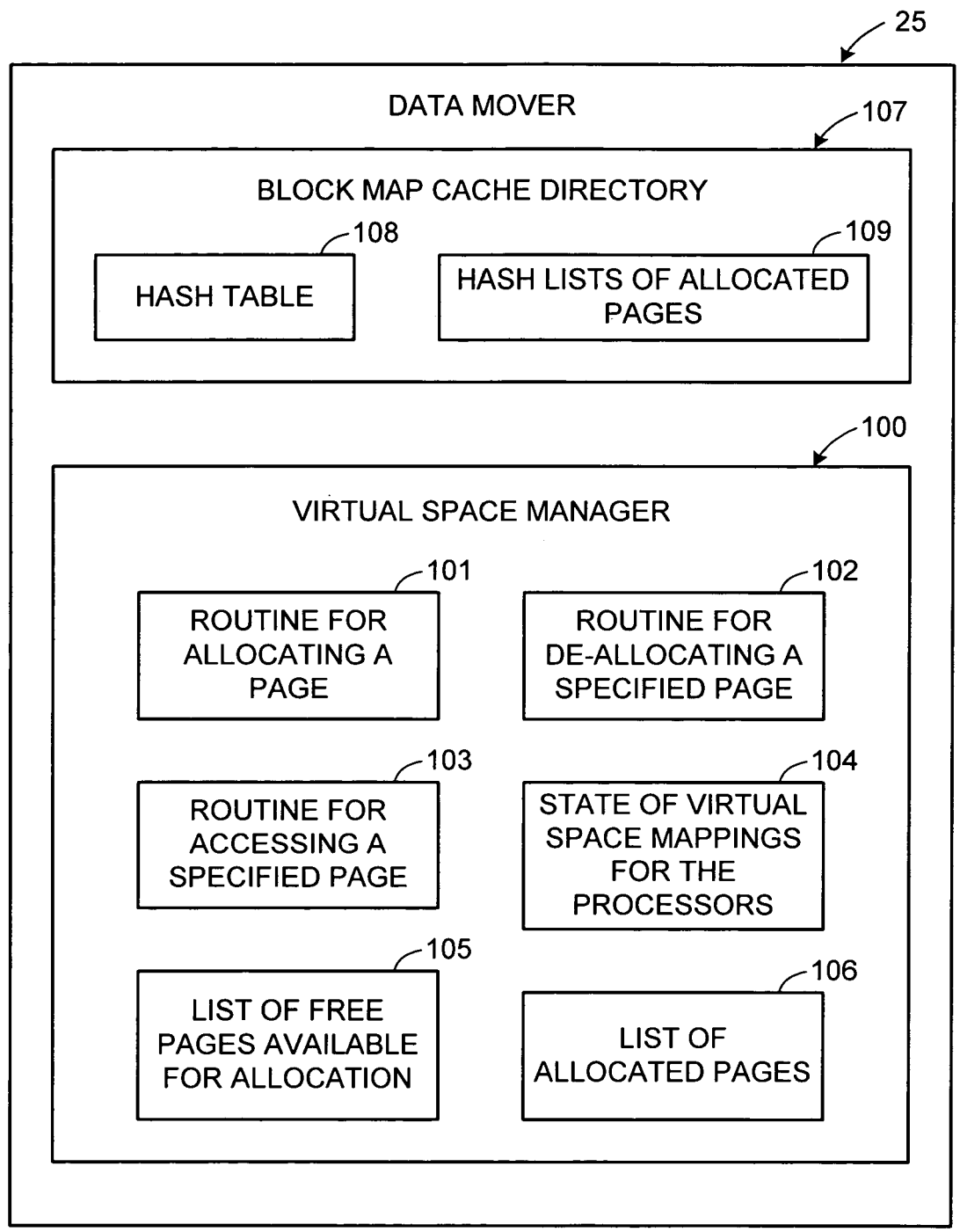
FIG. 12 shows a block map cache directory and a virtual space manager than can be used in a data mover for dynamic allocation of virtual pages from multiple virtual memory spaces to an application.

As shown in FIG. 12, for caching the snapshot copy block maps in memory from more than one virtual memory space, the data mover 25 can be programmed with a virtual space manager 100 that dynamically allocates pages of the virtual memory, and a conventional cache directory 107 that maps logical block addresses of blocks in the block maps to the allocated virtual memory pages. For example, the cache directory 107 has a hash table 108 of pointers to hash lists 109 of the virtual memory pages.

The virtual space manager 100 includes a routine 101 for allocating a page, a routine 102 for de-allocating a specified page, a routine 103 for accessing a specified page, memory 104 containing the current state of the virtual space mappings for the processors in the data mover, a list 105 of free pages available for allocation, and a list 106 of allocated pages.

Figure 13:
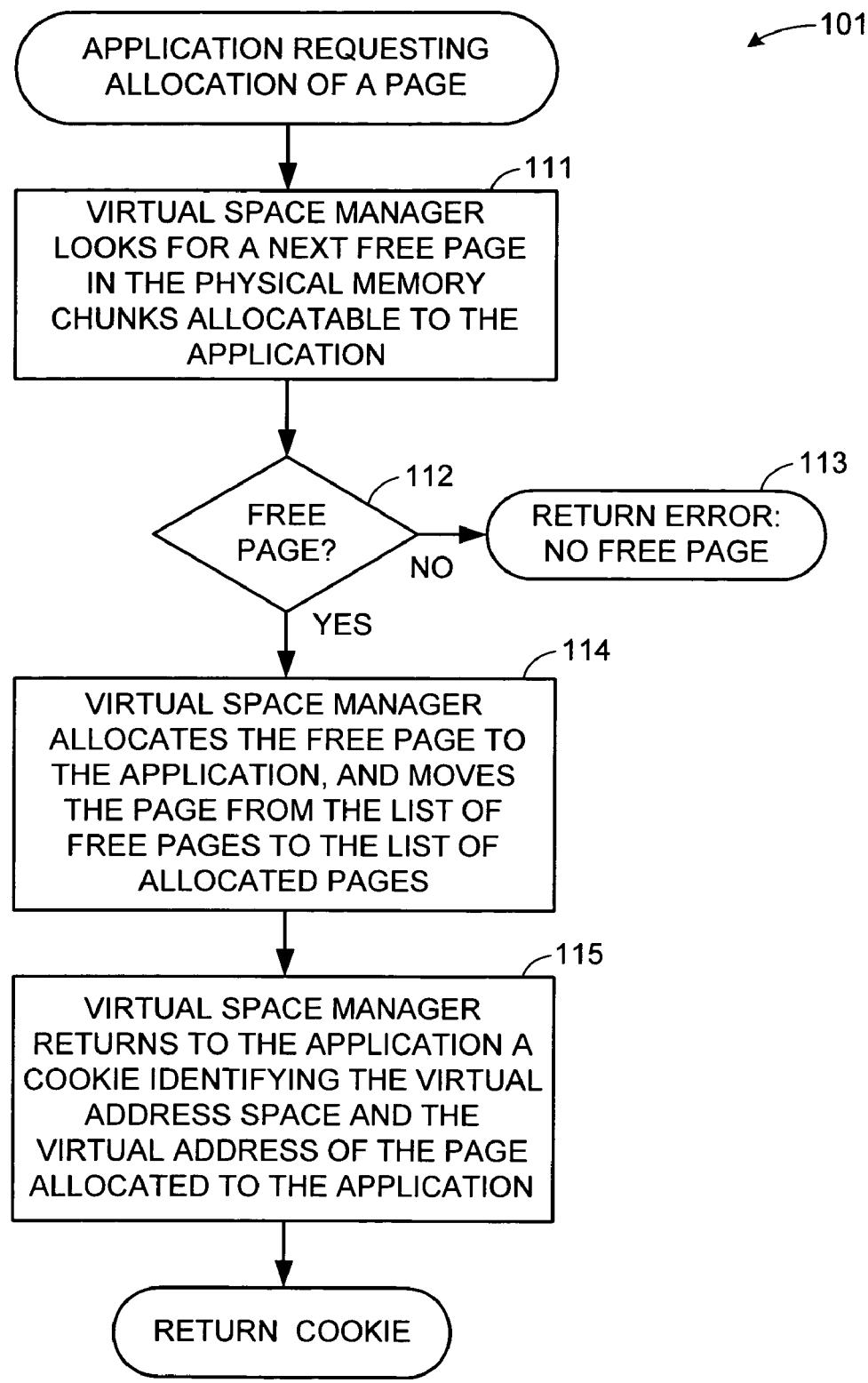
FIG. 13 is a flowchart of a routine in the virtual space manager for allocating a virtual page to an application and returning to the application a cookie indicating the virtual page.

FIG. 13 shows a flowchart of the routine 101 for allocating a page in response to a request from an application. In a first step 111, the virtual space manager looks for a next free page in the physical memory chunks allocatable to the application. In step 112, if a free page is not found, then in step 113 the virtual space manager returns to the application an error message indicating that no free page is available. Otherwise, if a free page is found, execution continues from step 112 to step 114. In step 114, the virtual space manager allocates the free page to the application, and moves the page from the list of free pages to the list of allocated pages. In step 115, the virtual space manager returns to the application a cookie identifying the virtual address space and the virtual address of the page allocated to the application. In general, in the computer programming art, a cookie is a handle, transaction ID, or other token of agreement between cooperating programs. The cookie used in step 115, for example, is a pointer to an entry for the page in the list of allocated pages, and the entry for the page contains the virtual address and an index to the virtual address space. After step 115, the routine is finished.

In the routine 102 for de-allocating a specified page, the virtual space manager looks for the specified page in the list of allocated pages, and if the specified page is found, then the virtual space manager removes the specified page from the list of allocated pages and returns the specified page to the list of free pages.

Figure 14:
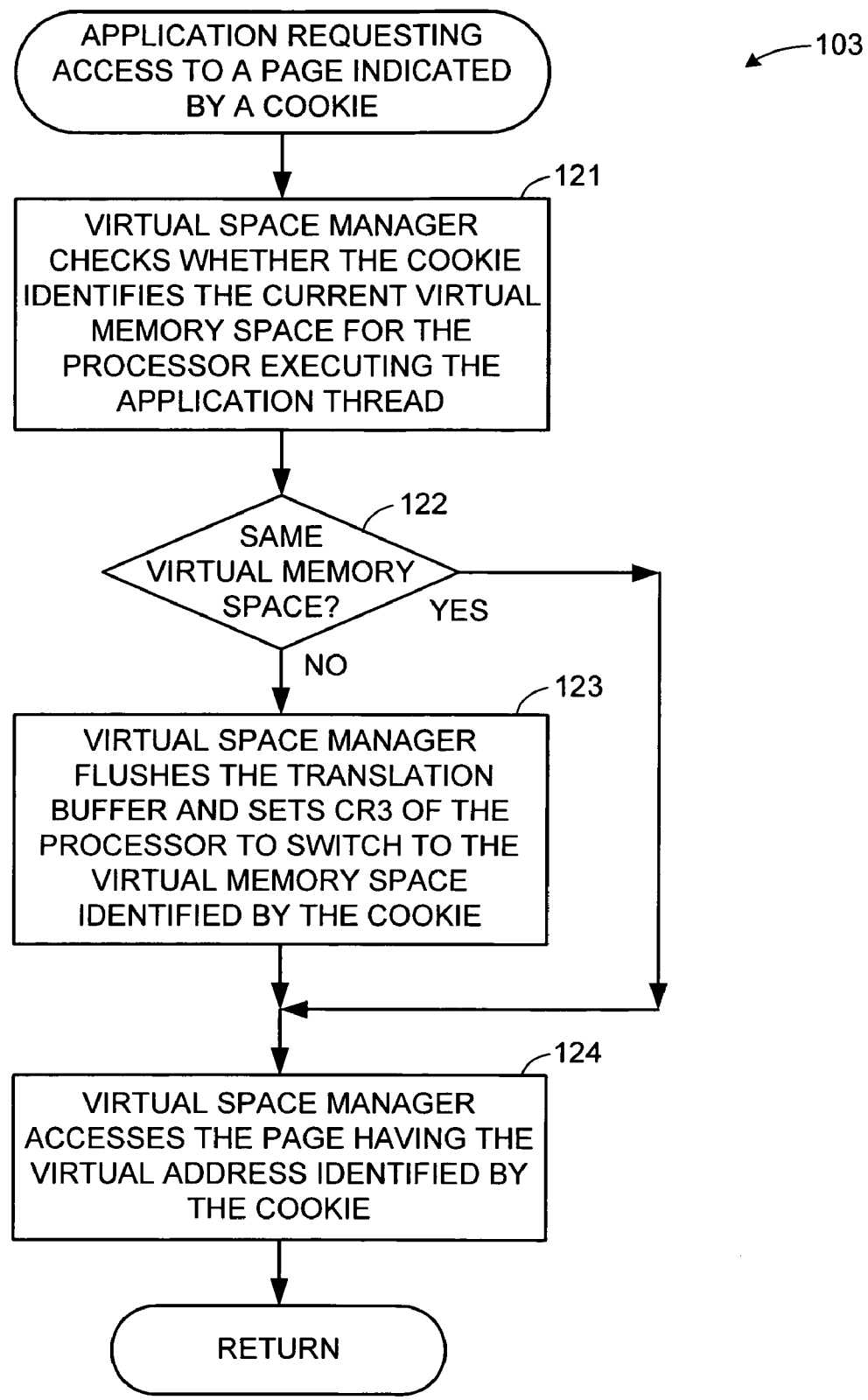
FIG. 14 is a flowchart of a routine in the virtual space manager for enabling an application to access a virtual page indicated by a cookie.

FIG. 14 shows a flowchart of the routine 103 for accessing a specified page in response to a request from an application. The request from the application includes a cookie indicating the specified page. In a first step 121, the virtual space manager checks whether the cookie identifies the current virtual memory space for the processor executing the application thread. If the cookie identifies the current virtual memory space for the processor executing the application thread, then in step 122 execution branches to step 124. Otherwise, if the cookie does not identify the same virtual memory space, then execution continues from step 122 to step 123. In step 123, the virtual space manager flushes the translation buffer and sets the control register CR3 of the processor executing the application thread in order to switch to the virtual memory space identified by the cookie. Execution continues from step 123 to step 124. In step 124, the virtual space manager accesses the page having the virtual address identified by the cookie, and then execution returns.

Upon return from the virtual space manager routine 103 of FIG. 12, the application can directly access different segments of the page for read or write operations so long as there is no change of the processor's virtual memory space. For example, just before an application calls the virtual space manager routine 103 of FIG. 12, the application disables thread scheduler preemption and does not enable thread scheduler preemption until the application is finished accessing the page. This prevents the thread scheduler from passing execution to another application until preemption is enabled.

Another way of ensuring that there is no change of the processor's virtual memory space until an application is finished accessing the page is to program the thread scheduler and any other application threads so that if the thread scheduler interrupts a processor executing an application accessing a virtual page, execution of the application will eventually return to the same processor with restoration from any change in the processor's virtual memory space. For example, execution of an application can be bound to a particular processor by a technique known as thread affinity, and priority can be assigned to applications accessing virtual pages in such a way that an application presently accessing a virtual page will be given priority over other applications. Thread affinity is further described in Jean-Pierre Bono, U.S. Patent Publication No. US 2003/0018691 A1 published Jan. 23, 2003, incorporated herein by reference. An application can indicate that it is finished accessing a virtual page by disabling virtual address translation for the processor.

Figure 15:
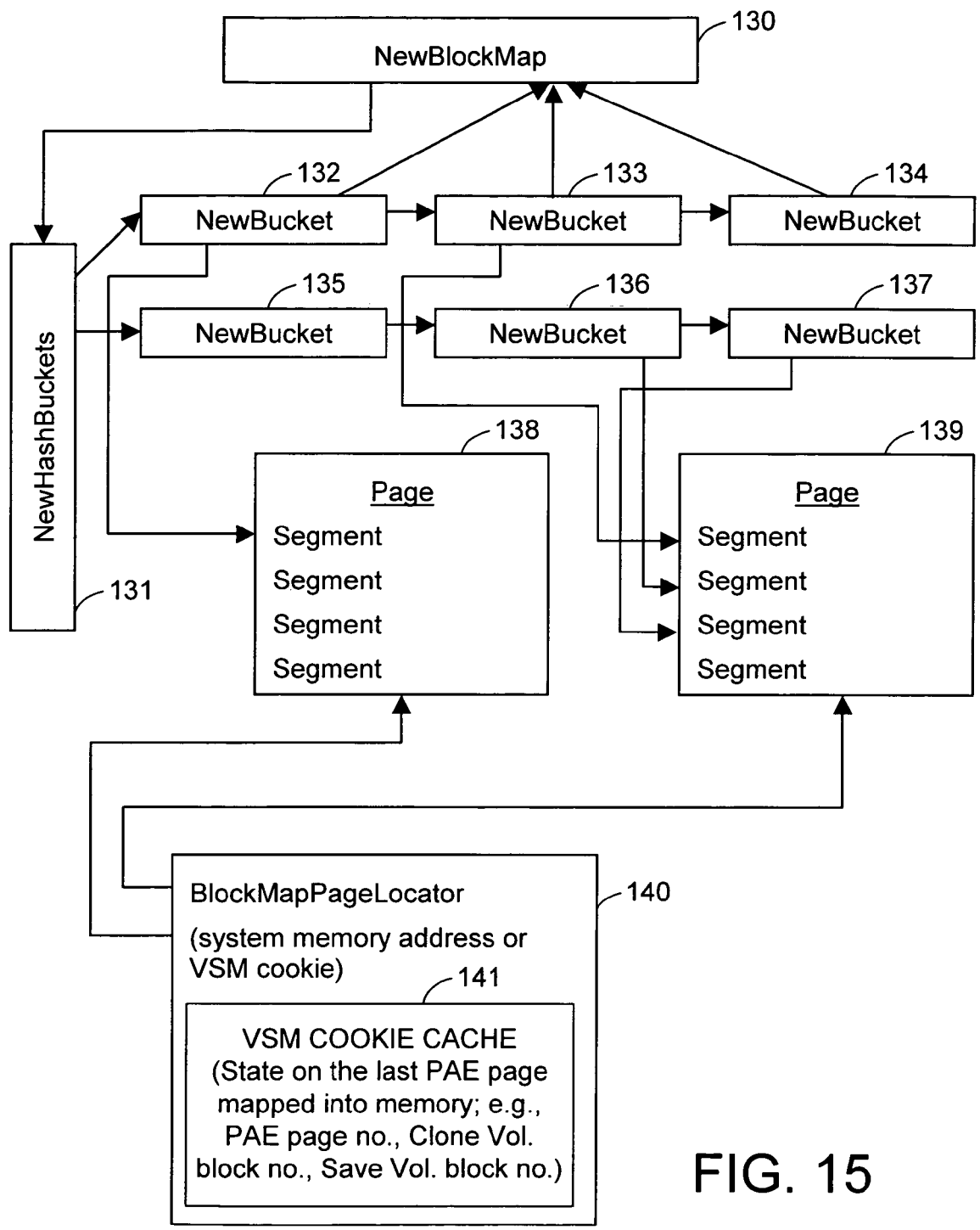
FIG. 15 is a block diagram of various objects in an object-oriented program embodiment of the virtual space manager (VSM) for managing snapshot copy block maps.

FIG. 15 shows various objects in an object-oriented program embodiment of the virtual space manager for managing snapshot copy block maps. In general, when the virtual space manager 100 allocates a new page to a thread, the page is mapped into the thread's address space using the virtual address of system memory given to the NewBlockMap object. This PAE page remains mapped until either another PAE page is needed during a block map operation, or until the block map operation completes. Upon completion of a block map operation, the PAE page is unmapped from the address space.

An alternative approach is to keep the PAE page mapped across consecutive block map operations. This could be done by storing a processor ID in a cookie cache 141 and comparing the stored processor ID against the actual processor ID in the subsequent block map operations. However, it is expected that there would be a low hit ratio against this processor ID across block map operations so that there would be little benefit from caching the processor ID in this fashion.

It is preferred for the virtual space manager to use any available PAE pages to allocate new chunks of memory. However, a mixture of PAE pages and regular pages (in the lower 4 gigabytes of physical memory) can exist within the same NewBlockMap object. A configuration parameter is available to disable use of PAE, in which case the virtual space manager can allocate regular pages.

A NewBlockMap class 130 is instantiated to create a new block map for a new snapshot copy. The NewBlockMap class 130 provides a cookie (NewBucketCookie) to permit a caller to update a block map entry through a NewBlockMap interface call so that callers need not be allowed to make direct changes to block map entries. To prevent unnecessary PAE page unmappings during a block map operation, the NewBlockMap class maintains state on the last PAE page mapped into memory. This is called the "VSM Cookie Cache." The NewBlockMap interfaces are the gateways for managing the cache, and each is changed to prime the cache on entry and to flush it before exiting. Blockmap lookup operations benefit from this cache by avoiding repeated VSM mappings if successive accesses to blockmap segments fall into the same VSM page.

In the preferred implementation, clients of the VSM either disable preemption while a thread has a page mapped in, or processor affinity is set for the thread during the mapping operation. VSM guarantees only to purge the translation buffer on the processor on which the mapping is requested. The conventional snapshot mechanism had almost always required the locking of a block bitmap mutex, which disabled preemption, so generally there is no need or advantage to set processor affinity for the thread during the mapping operation. There are some cases, such as when the snapshot context is being created, that do not acquire a mutex before making an update to the blockmap. In these instances it is more convenient and less burdensome in terms of processor overhead to add additional synchronization primitives than to set processor affinity.

A NewHashBuckets class 131 is used to link instances 132 to 137 of a NewBucket class into the hash directory list structure of FIG. 15. One instance of NewBucket exists for each allocated blockmap segment.

Each page 138, 139 containing blockmap entries is divided into segments. The conventional snapshot mechanism used segmentation for more efficient use of memory, particularly for the case where only one entry may have resided in a bucket and the bucket size was one page. This segment size is increased in order to reduce the overhead of mapping pages through VSM. Furthermore, tuning parameters can be used to vary the segment size to determine what impact the different sizes have on performance.

A BlockMapPage Locator 140 is a system memory address referencing a regular page, or a VSM cookie referencing a PAE page. To support PAE blockmap pages, the VSM cookie is stored in the NewBucket instance, and also a pointer to the NewBlockMap object is stored in the NewBucket instance in order to manage the VSM cookie cache. For example, the NewBucket is organized as follows:

```
class NewBucket {
union {
        NewBlockMapEntry* BlockMapArray;
        VirtualSpaceCookie VSCookie;
} u_nb;
short unsigned int count;
    struct {
        unsigned int is_vsm : 1;
        unsigned int is_unused : 2;
        unsigned int is_offset : 13;
    } nb_packed;
    NewBucket* NextBucket;
    }
```

The variable "is vsm" indicates whether the NewBucket instance is a PAE segment or a regular page segment. If it is a PAE segment, then the VSCookie is used to reference the NewBlockMap object to find the virtual address the page is mapped to. Then "is_offset" is added to find the segment within the page. Otherwise, if the NewBucket instance is a regular page segment, then BlockMapArray directly addresses the segment. To speed up searching of the block map for a given block, the NewBucket could include two additional integer data members to record the high and low block numbers contained in the NewBucket object.

The NewBlockMap class has five public interface methods. A conventional page allocator returns a pointer to an allocated page. For allocation of or access to a PAE page, the NewBlockMap public interface methods use a NewBucketCookie instead of a pointer. The NewBlockMap public interface methods are listed below:

```
// Method to create a new mapping (for a block on
Clone Volume "FsVol" to be snapped)
    boolean_t CreateMapping (BlockIndex FsVolBlockNumber,
                            BlockIndex
SaveVolBlockNumber,
            NewBucketCookie* BucketCookie=NULL);
    // Method to start to create a new mapping (for a
block on Clone Volum "FsVol" to be snapped)
    boolean_t StartCreateMapping (BlockIndex
FsVolBlockNumber,
            NewBucketCookie* BucketCookie=NULL);
void UpdateBlockMapEntry (NewBucketCookie& BucketCookie,
            BlockIndex SaveVolBlockNumber);
    // Method to retreive a block mapping
    BlockIndex GetMapping (BlockIndex FsVolBlockNumber,
            NewBucketCookie* BucketCookie=NULL);
    // Method to retrieve next block map
    boolean_t GetNextMapping (NewBucketCookie&
theBucketCookie,
            BlockIndex setSaveVolBlockNumber=0);
```

The following are new methods added to make use of the NewBucketCookie. They either get or set values in a NewBlockMapEntry. The cookie contains information that allows the NewBucket layer to perform a direct access on the block map segment, for performance advantages.

```
void SetSnapped(NewBucketCookie& BucketCookie);
void SetSnapInprogress(NewBucketCookie& BucketCookie);
void SetSnapInProgressFly(NewBucketCookie&
BucketCookie);
    BlockIndex GetFsVolBlockNumber(NewBucketCookie&
BucketCookie);
    BlockIndex GetSaveVolBlockNumber(NewBucketCookie&
BucketCookie);
```

The NewBlockMap class has additional functions and data structures that use the VSM cookies. The function GetPageSegment uses VSCookieForSegments to store the VSM cookie for repeated segment allocations from the same page:
VirtualSpaceCookie VSCookieForSegments;

The virtual memory address that all PAE pages are mapped to for a particular NewBlockMap object is stored in AddressUsedForPAE:
addr_t AddressUsedForPAE;

The following declarations are used to track all pages allocated to a NewBlockMap object. The destructor uses the chain of pages to free the pages.

```
enum AllocatedMemoryType {
    RegularMemory = 1,   // VirtualAddress below is a
valid address
    PAEMemory = 2        // VSCookie below is a valid VSM
cookie
    };
typedef struct {
    AllocatedMemoryType MemoryType;
    union {
        addr_t VirtualAddress;
        VirtualSpaceCookie VSCookie;
    } u;
} BlockMapPageLocator;
```

The NewBlockMap class has a number of private member functions that manage the VSM cookie cache. This cache attempts to prevent unnecessary VSM mappings during a blockmap operation when consecutively accessed blockmap segments happen to be in the same page. These private member functions include:

```
void  VSCookieSetup( );      // Readies VSM cookie cache
void  ClearCurrentVSCookie( ); // Clears VSM cookie
cache
    void  SetCurrentVSCookie (VirtualSpaceCookie&
VSCookie);
```

The NewBucket object is provided with a public interface that uses VSM cookies instead of direct pointers because the page that an entry is contained in will be unmapped after leaving the NewBlockMap layer. This public interface includes the following methods:

```
boolean_t AddEntry (BlockIndex theFsVolBlockNumber,
                    BlockIndex theSaveVolBlockNumber,
                    NewBucketCookie*
                    BucketCookie=NULL);
    boolean_t GetEntry (const BlockIndex
theFsVolBlockNumber,
                    BlockIndex& theSaveVolBlockNumber,
```

```
                    NewBucketCookie*
theBucketCookie=NULL);
    boolean_t GetNextEntry(BlockMapCookie&
theBlockMapCookie,
                    NewBucketCookie& theBucketCookie,
                    BlockIndex
setSaveVolBlockNumber);
```

The following additional methods were added to use the NewBucketCookie to update a previously located blockmap entry. They need not be used outside the NewBlockMap interface.

```
// Method to store a SavVolNumber given an index into
a bucket.
    void SetSaveVolBlockNumber(const BlockIndex
theSaveVolBlockNumber,
                    const NewBucketIndex
BucketIndex);
    // Get the SavVolNumber given an index in a bucket.
    BlockIndex GetSaveVolBlockNumber(const NewBucket Index
theBucketIndex);
    // Retrieves the FsVolNumber given an index into a
bucket.
    BlockIndex Get FsVolBlockNumber(const NewBucketIndex
theBlockIndex);
```

Two new interfaces are added to map and unmap PAE pages. The MapMemory assumes the caller has either disabled preemption, or has affined the thread to a processor. These two interfaces are:

```
    // Insure the blockmap memory used for this bucket is
resident
    // in regular memory.
        void MapMemory( );
    // If necessary, release the blockmap memory for this
bucket.
        void UnmapMemory( );
```

Figure 16:
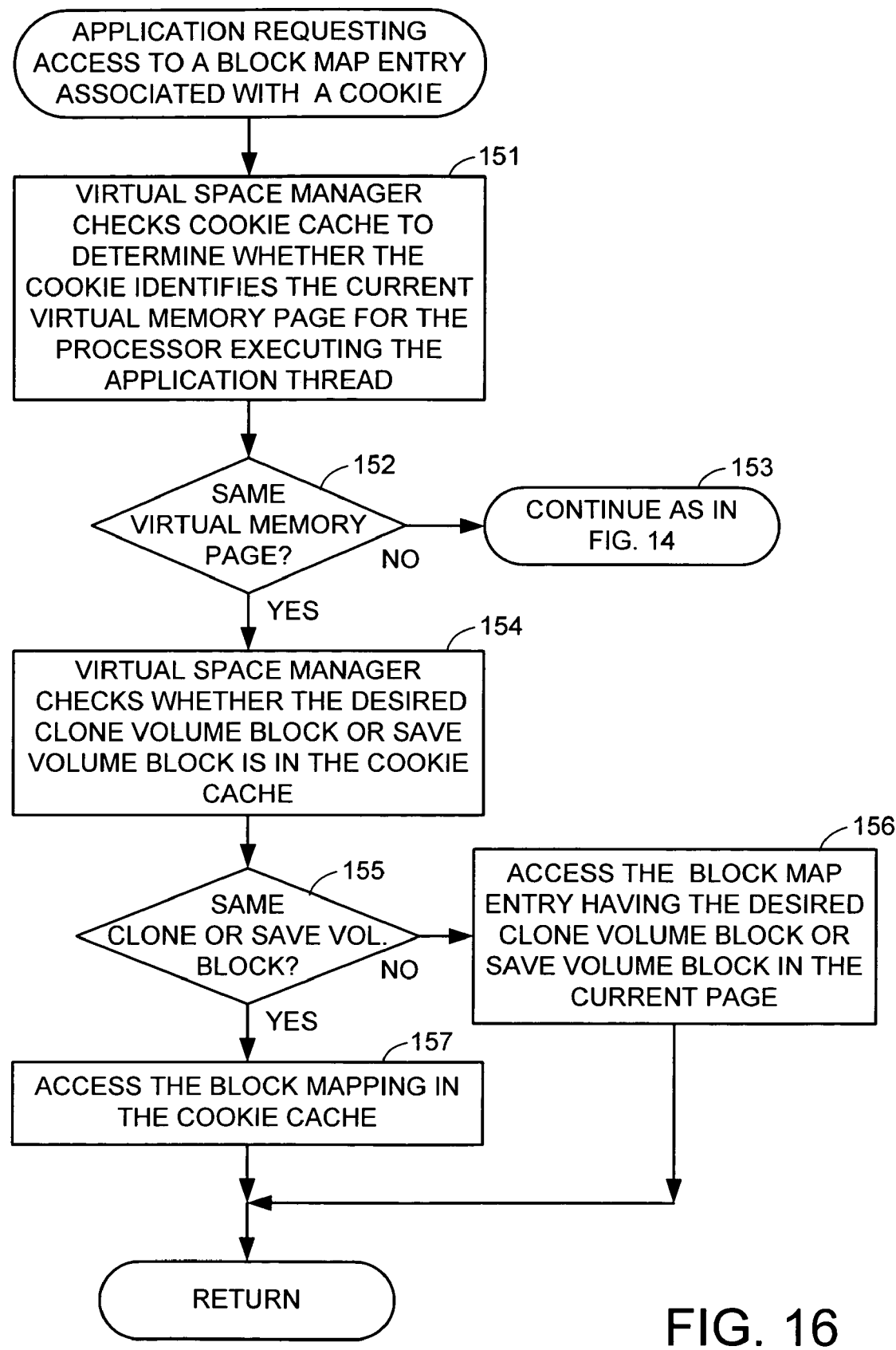
FIG. 16 is a flowchart of a routine in the block map page locator of FIG. 15 for accessing a block map entry associated with a cookie.

The VSM cookie cache 141 caches the values of the clone volume and save volume block numbers, and maintains state on where to find a particular entry within a block map segment. As shown in FIG. 16, for example, when an application requests access to a block map entry associated with a cookie, in step 151 the virtual space manager checks the cookie cache to determine whether the cookie identifies the current virtual memory page for the processor executing the application thread. If not, then in step 152, execution branches to step 153 to continue as described above with reference to FIG. 14, to determine if a new virtual space mapping is needed, and to map to the page having the desired block map entry. Otherwise, the desired block map entry should be found within the current virtual memory page, and execution continues to step 154.

In step 154, the virtual space manager checks whether the desired clone volume block or the desired save volume block is in the cookie cache. If the desired file system block or the desired save volume block is not the same as the clone volume block or the save volume block in the cookie cache, then execution branches from step 155 to step 156. In step 156, the virtual space manager accesses the block map entry having the desired clone volume block or save volume block in the current page, and then execution returns.

In step 155, if the cookie cache contains the desired clone volume block or save volume block, then execution continues from step 155 to step 157. In step 157, the virtual space manager accesses the block mapping in the cookie cache, and then execution returns.

Figure 17:
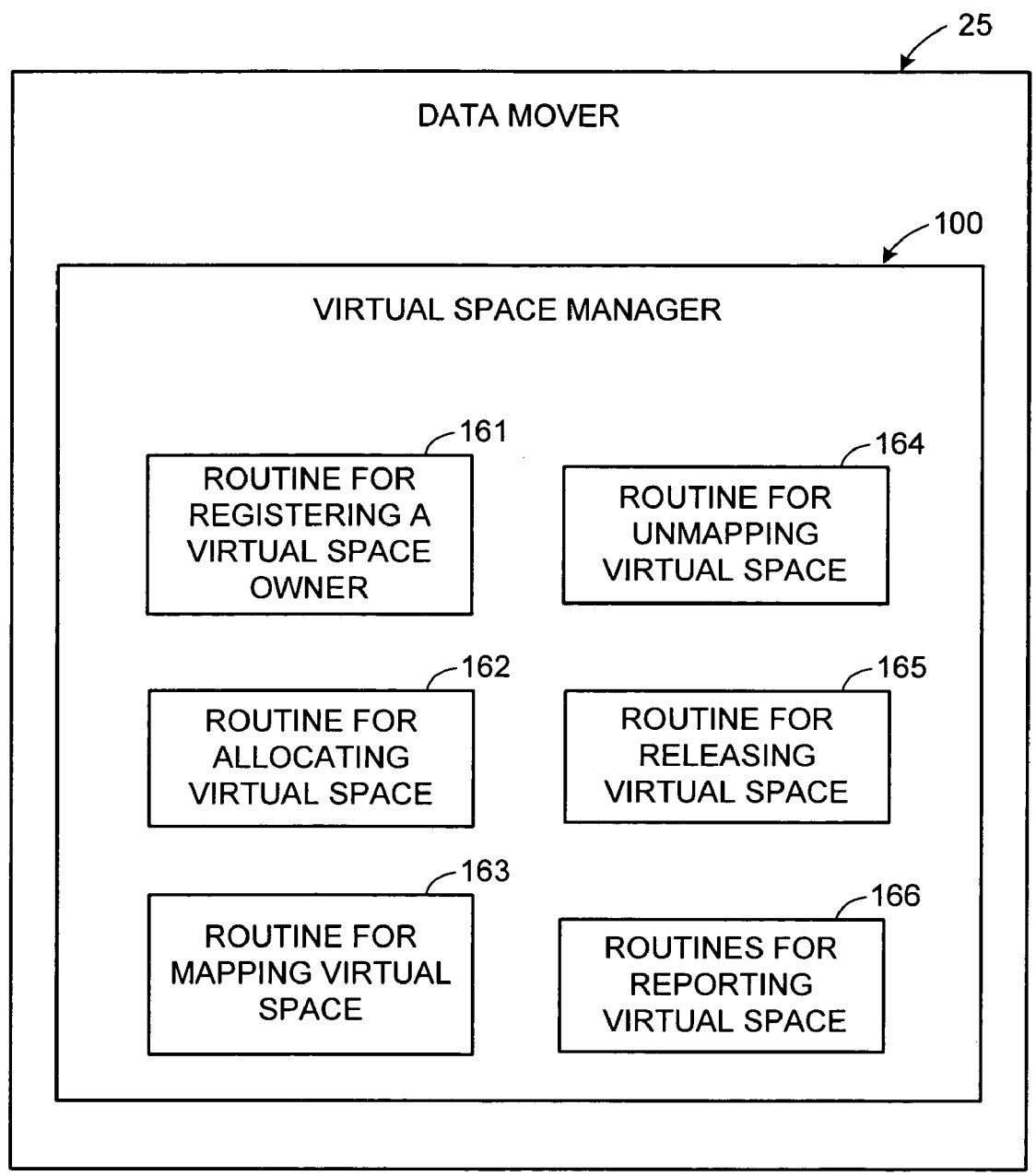
FIG. 17 is a block diagram of various routines in the virtual space manager for managing the allocation of chunks of virtual memory to registered applications.

As described above with respect to FIGS. 12 to 16, the virtual space manager 100 has a number of routines 101–103 for dynamically allocating pages of memory for a particular purpose; namely, for storing block maps for snapshot copies. As shown in FIG. 17, the virtual space manager 100 also has a number of routines 161 to 166 for managing the allocation of virtual space to registered applications. The routines include a routine 161 for registering a virtual space owner, a routine 162 for allocating virtual space, a routine 163 for mapping virtual space, a routine 164 for unmapping virtual space, a routine 165 for releasing virtual space, and routines 166 for reporting virtual space.

In operation, the virtual space manager 100 allocates variable-size chunks of memory to respective registered applications. Each chunk of memory starts at a specified virtual address within a range of 0 to 4 gigabytes, and includes a specified number of contiguous pages following the specified virtual address in the range of 0 to 4 gigabytes. For example, the virtual space manager routines 161–165 could be used for allocating and managing the access of the DNLC application to the chunk C4 shown in the memory map of FIG. 5. Once an application is registered and a chunk of memory is allocated to an application, any thread instance of the application can map to the chunk and then access the chunk.

The routines 166 for reporting virtual space can be called to report whether or not more than four gigabytes of total physical memory are present in the data mover, to report the total number of four kilobyte physical pages of memory present in the data mover (over and above the four gigabyte limit), and to report the number of unallocated four kilobyte physical pages of memory (over and above the four gigabyte limit).

Figure 18:
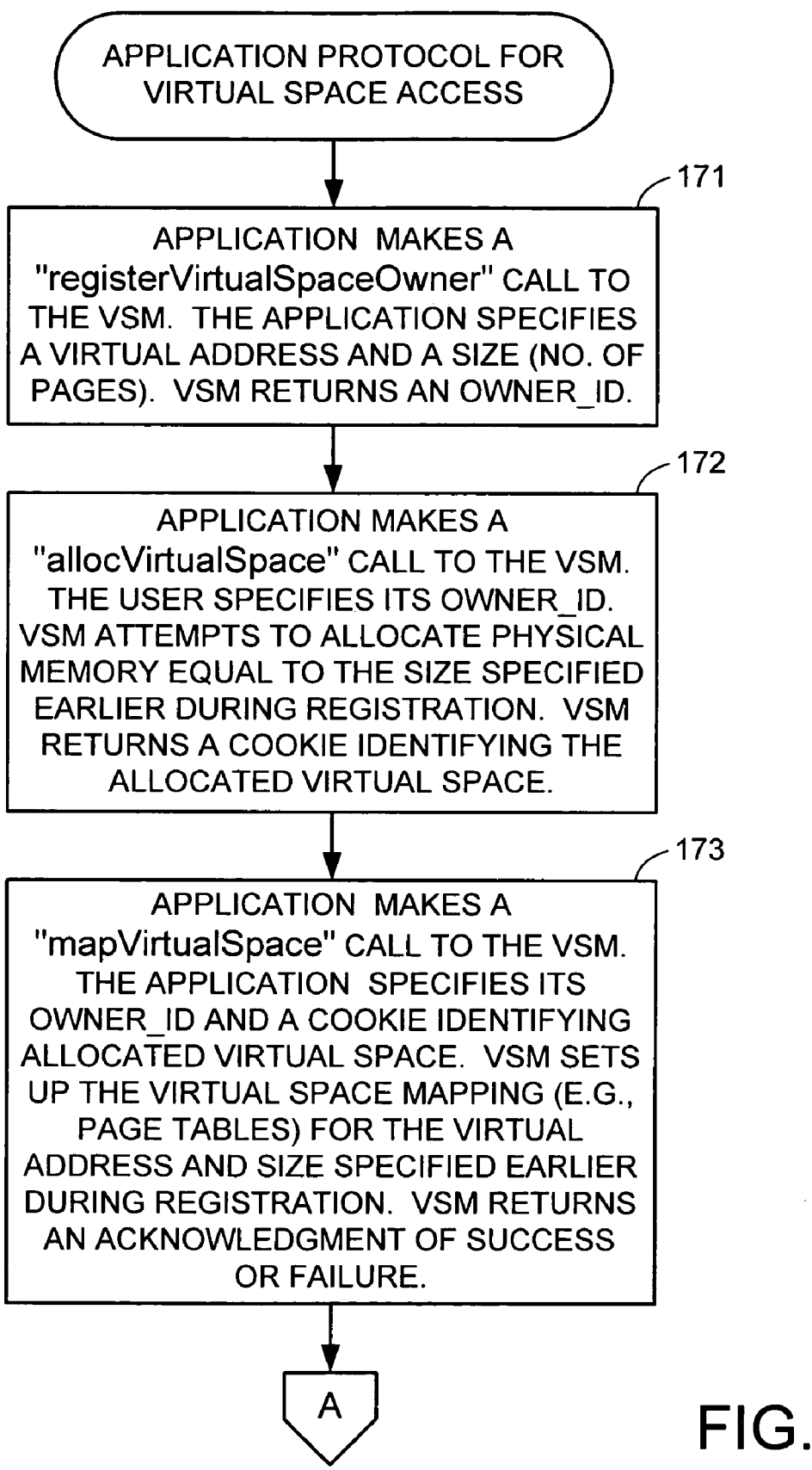
FIGS. 18 and 19 comprise a flowchart of an application protocol for invoking the virtual space manager routines of FIG. 17.
Figure 19:
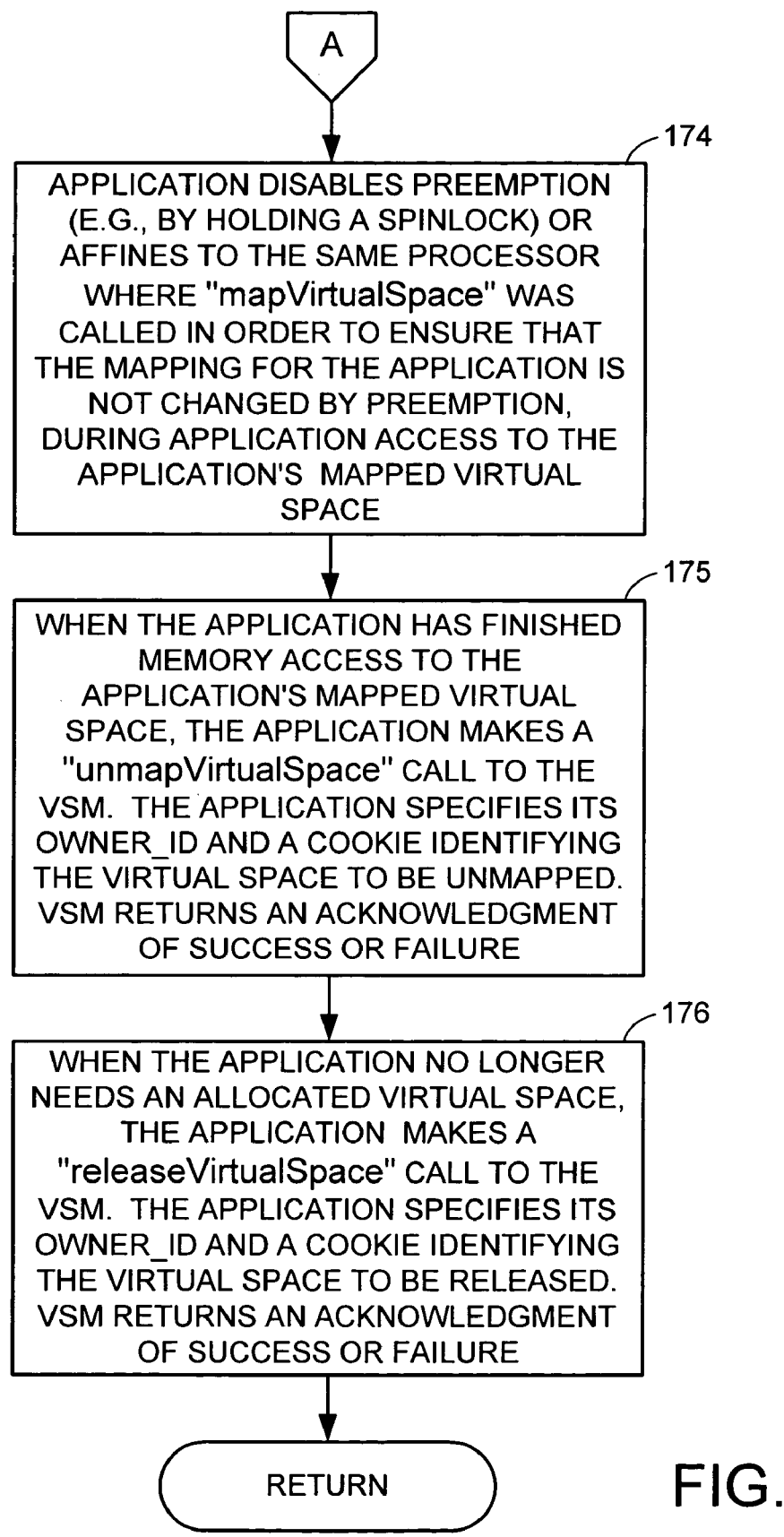

The virtual space manager routines 161–165 are designed for an application protocol for virtual space access as shown in FIGS. 18 and 19. In a first step 171 of FIG. 18, the application makes a "registerVirtualSpaceOwner" call to the VSM. The application specifies a virtual address and a size for the chunk to be allocated to the application. The VSM returns an Owner_ID.

In step 172, the application makes a "allocVirtualSpace" call to the VSM. The application specifies its Owner_D. The VSM attempts to allocate physical memory equal to the size specified earlier during registration. The VSM returns a cookie identifying the allocated virtual space.

In step 173, the application makes a "mapVirtualSpace" call to the VSM. The application specifies its Owner_ID and a cookie identifying the allocated virtual space. The VSM sets up the virtual space mapping (e.g., page tables) for the virtual address and size specified earlier during registration. The VSM returns an acknowledgement of success or failure.

In step 174, the application disables preemption (e.g., by holding a spinlock) or affines to the same processor where "mapVirtualSpace" was called in order to ensure that the mapping for the application is not changed by preemption, during application access to the application's mapped virtual space.

In step 175, when the application has finished memory access to the application's mapped virtual space, the application makes a "unmapVirtualSpace" call to the VSM. The application specifies its Owner_ID and a cookie identifying the virtual space to be unmapped. VSM returns an acknowledgement of success or failure.

In step 176, when the application no longer needs an allocated virtual space, the application makes a "releaseVirtualSpace" call to the VSM. The application specifies its Owner_ID and a cookie identifying the virtual space to be released. VSM returns an acknowledgement of success or failure.

In a preferred implementation, the virtual space manager routines 161–165 have the following format and functionality:

---

VirtualSpaceOwner registerVirtualSpaceOwner(addr_t &v_addr,const unsigned int n_pages);

---

The registerVirtualSpaceOwner method will register the caller as a Virtual Space Owner. Typically, the entire subsystem would be considered an owner. But once a virtual space has been allocated, any thread in the system can map it and use it (with some restrictions, as described below). Also, a particular subsystem can register more than once as an owner if it needs separate sets of virtual spaces. Each registered owner has a predefined virtual space size and virtual mapping location. These will not change once the owner has registered. The caller will get an identifier that identifies that caller as a virtual space owner in all later calls to allocVirtualSpace. Each call to allocVirtualSpace will result in the creation of a new virtual space, and multiple calls can be made from the same thread. The first time this interface is called, VSM initializes itself. This will avoid the wastage of memory when VSM is initialized but never used at all.

The registerVirtualSpaceOwner method has the parameters v_addr and n_pages. V_addr is the virtual address that will be used while mapping in any virtual space for this owner. It is aligned to 4 KB. If it is NULL, a virtual address range n_pages in size will be allocated and v_addr will be set to the start of this address range. If a subsystem already has a static data structure (and hence a virtual address) that it plans to have several instances of by using VSM, then it probably makes sense to use this virtual address while registering. But if a subsystem has to dynamically allocate a virtual address just to use during VSM registration, then it might as well let the VSM allocate it.

It is also possible that two different owners may use the same virtual address. In this case, the two different owners are then responsible for their own locking and synchronization to avoid conflicting access. The parameter n_pages is the number of 4 KB pages that will be mapped in starting at v_addr.

The registerVirtualSpaceOwner method returns a virtual space owner identifier (VirtualSpaceOwner). It may be compared with NullVirtualSpaceOwner to check if the registration was not successful.

---

VSM_Status allocVirtualSpace(const VirtualSpaceOwner owner, VirtualSpaceCookie &vs);

---

The allocVirtualSpace method will allocate a predefined amount of physical space from the extended physical memory and create an identifier (a cookie) for it. The caller must use this cookie in all later usage (map, unmap or release) of this virtual space. The virtual space is not mapped in when it is allocated. Instead, a separate call is made to the map VirtualSpace method to map it in.

The allocVirtualSpace method has the parameters owner and vs. Owner should be the value that was obtained from the registerVirtualSpaceOwner call. Vs will contain the virtual space cookie when this method returns.

The allocVirtualSpace method returns an acknowledgement (VSM_Status) having the following values: VSM_OK—success; VSM_OUT_OF_MEMORY—if VSM runs out of physical memory, and VSM_UNAVAILABLE—if VSM has not been initialized.

---

VSM_Status mapVirtualSpace (const VirtualSpaceOwner owner, const VirtualSpaceCookie vs);

---

The map VirtualSpace method maps in the virtual space identified by the cookie. The caller can now access this memory freely using the virtual address specified during owner registration. The caller must use a valid cookie; i.e., the cookie must be exactly what was obtained by a call to allocVirtualSpace and has not yet been released by a call to release VirtualSpace. The caller must also guarantee that the thread is not preempted or the thread is affined to the same processor on which the mapping is active. The mapping is only valid on one processor.

The mapVirtualSpace method has the parameters owner and vs. Owner is the value that was obtained from the registerVirtualSpaceOwner call. Vs is the cookie that was obtained from an allocVirtualSpace call.

The mapVirtualSpace method returns an acknowledgement (VSM_Status) having the following values: VSM_OK—success; and VSM_UNAVAILABLE—if VSM has not been initialized.

---

VSM_Status unmapVirtualSpace (const VirtualSpaceOwner owner, const VirtualSpaceCookie vs);

---

The unmapVirtualSpace method unmaps the virtual space identified by the cookie. The caller can no longer access the physical memory behind this virtual space. The caller must use a valid cookie; i.e., the cookie must be exactly what was obtained by the call to allocVirtualSpace and has not yet been released by a call to release VirtualSpace (see below). The original (virtual=physical) mapping for that virtual address is restored.

The unmapVirtualSpace method has the parameters owner and vs. Owner is the value that was obtained from the registerVirtualSpaceOwner call. Vs is the cookie that was obtained from an allocVirtualSpace call.

The unmapVirtualSpace method returns an acknowledgement (VSM_Status) having the following values: VSM_OK—success; and VSM_UNAVAILABLE—if VSM has not been initialized.

---

VSM_Status releaseVirtualSpace (const VirtualSpaceOwner owner, const VirtualSpaceCookie vs);

---

The releaseVirtualSpace method releases the virtual space identified by the cookie. After calling this method, the current owner of this virtual space will no longer own this space. Therefore no attempt should be made to pass this cookie in any later calls to map/unmap/release. In debug-on code, VSM will assert if an attempt is made to release a virtual space before unmapping it first.

The releaseVirtualSpace method has the parameters owner and vs. Owner is the value that was obtained from the registerVirtualSpaceOwner call. Vs is the cookie that was obtained from an allocVirtualSpace call.

The release VirtualSpace method returns an acknowledgement (VSM_Status) having the following values: VSM_OK—success; and VSM_UNAVAILABLE—if VSM has not been initialized.

In view of the above, there has been described a virtual space manager for a digital computer having a physical address extension feature that maps multiple virtual memory spaces to an extended physical memory. The virtual space manager responds to a request from an application for allocation of a page of physical memory by returning a cookie indicating the allocated page. The virtual space manager responds to a request including the cookie by switching virtual address translation to the virtual memory space including the indicated page. The cookie is used to access a cookie cache of state information on the last page of virtual memory having been mapped into physical memory. For example, segments of the page store block map entries for snapshot copies, and the cookie cache caches the last-accessed values of the block numbers and their location within the page. The cookie, in conjunction with new methods in the NewBlockMap class as described above, provides an improved interface for updating block map entries. It is efficient for retrieval because it caches the block numbers without requiring lookups within the block map entries. It also maintains efficiency by maintaining state that allows fast updating of a block map entry.

What is claimed is:

1. A digital computer comprising at least one processor for producing virtual addresses over a range of virtual addresses, at least one translation buffer coupled to said at least one processor for producing physical addresses from the virtual addresses in accordance with a current virtual-to-physical address mapping, and a random access memory being addressable by the physical addresses and coupled to said at least one processor for supplying data to said at least one processor, wherein the random access memory includes physical memory having a range of physical addresses that is greater than the range of virtual addresses, and the digital computer is programmed with a plurality of different virtual-to-physical address mappings for identical virtual addresses to define a plurality of respective virtual memory spaces having the different virtual-to-physical address mappings for the identical virtual addresses, and wherein the digital computer is programmed with a virtual space manager, the virtual space manager including an allocation routine for responding to an allocation request from an application for allocation of at least one page of the physical memory by returning an indication of said at least one page of the physical memory, and a mapping routine for responding to a mapping request from the application, the mapping request including the indication of said at least one page of the physical memory, the mapping routine being executable by the digital computer for switching the current virtual-to-physical address mapping to a virtual-to-physical address mapping including the indicated said at least one page of the physical memory, and wherein the indication of said at least one page of the physical memory is a cookie, and the digital computer is programmed with a cookie cache of state information on a last page of virtual memory having been mapped into the physical memory.

2. The digital computer as claimed in claim 1, wherein the digital computer is programmed for responding to an application request including the cookie by accessing the cookie cache to determine whether the cookie identifies the last page of virtual memory having been mapped into the physical memory, and upon determining that the cookie identifies the last page of virtual memory having been mapped into the physical memory, accessing the last page of virtual memory without switching the current virtual-to-physical address mapping.

3. The digital computer as claimed in claim 1, which is programmed for responding to an application request including the cookie by accessing the cookie cache to determine whether the cookie identifies a last page of virtual memory having been mapped into the physical memory, and upon determining that the cookie identifies the last page of virtual memory having been mapped into the physical memory, accessing the state information in the cookie cache to respond to the application request.

4. The digital computer as claimed in claim 3, wherein the application request is a request for information about a mapping between a pair of data blocks, and the state information in the cookie cache includes a data block mapping in the last page of virtual memory having been mapped into the physical memory.

5. The digital computer as claimed in claim 1, wherein the virtual space manager includes a routine for receiving from the application a specification of a virtual address and a number of pages for a virtual space to be allocated to the application and mapped to the physical memory.

6. A method of operating a digital computer having at least one processor for producing virtual addresses over a range of virtual addresses, at least one translation buffer coupled to said at least one processor for producing physical addresses from the virtual addresses in accordance with a current virtual-to-physical address mapping, and a random access memory being addressable by the physical addresses and coupled to said at least one processor for supplying data to said at least one processor, the random access memory containing physical memory having a range of physical addresses that is greater than the range of virtual addresses, wherein the digital computer is programmed with a plurality of different virtual-to-physical address mappings for identical virtual addresses to define a plurality of respective virtual memory spaces having the different virtual-to-physical address mappings for the identical virtual addresses, said method comprising:

the digital computer responding to an allocation request from an application for allocation of at least one page of memory by returning an indication of said at least one page of allocated memory in a virtual memory space; and the digital computer responding to a mapping request from the application, the mapping request including the indication of said at least one page of allocated memory, the digital computer responding to the mapping request by switching the current virtual-to-physical address mapping to the virtual memory space including the indicated said at least one page of allocated memory, wherein the indication of the page of allocated memory is a cookie, and the method includes caching, in a cookie cache, state information on a last page of virtual memory having been mapped into physical memory.

7. The method as claimed in claim 6, which includes the digital computer responding to an application request including the cookie by accessing the cookie cache to determine whether the cookie identifies the last page of virtual memory having been mapped into physical memory, and upon determining that the cookie identifies the last page of virtual memory having been mapped into physical memory, accessing the last page of virtual memory without switching the current virtual-to-physical address mapping.

8. The method as claimed in claim 6, which includes the digital computer responding to an application request including the cookie by accessing the cookie cache to determine whether the cookie identifies the last page of virtual memory having been mapped into physical memory, and upon determining that the cookie identifies the last page of virtual memory having been mapped into physical memory, accessing the state information in the cookie cache to respond to the application request.

9. The method as claimed in claim 8, wherein the application request is a request for information about a mapping between a pair of data blocks, the state information in the cookie cache includes a data block mapping in the last page of virtual memory having been mapped into physical memory, and the method includes the digital computer accessing the data block mapping in the cookie cache in response to the application request.

10. The method as claimed in claim 6, which includes the digital computer initially receiving from the application a specification of a virtual address and a number of pages for a virtual space to be allocated to the application and mapped to the physical memory.

* * * * *

UNITED STATES PATENT AND TRADEMARK OFFICE
CERTIFICATE OF CORRECTION

PATENT NO. : 7,206,915 B2  Page 1 of 1
APPLICATION NO. : 10/860523
DATED : April 17, 2007
INVENTOR(S) : DeSouter et al.

It is certified that error appears in the above-identified patent and that said Letters Patent is hereby corrected as shown below:

Title Page;
On page 1, after the listing of Inventors and before the Notice, the following is inserted:

-- (73) Assignee: EMC Corporation, Hopkinton, MA (US) --.

Signed and Sealed this

Twenty-fourth Day of November, 2009

David J. Kappos
*Director of the United States Patent and Trademark Office*